United States Patent
Hwang et al.

(10) Patent No.: US 10,818,915 B2
(45) Date of Patent: Oct. 27, 2020

(54) GRAPHENE-COATED POROUS SILICON-CARBON COMPOSITE AND METHOD OF MANUFACTURING THE SAME

(71) Applicant: LG Chem, Ltd., Seoul (KR)

(72) Inventors: Eui Yong Hwang, Daejeon (KR); In Young Kim, Daejeon (KR); Jin Yeong Lee, Daejeon (KR); Won Jong Kwon, Daejeon (KR); Kwon Nam Sohn, Daejeon (KR); Seung Bo Yang, Daejeon (KR)

(73) Assignee: LG Chem, Ltd. (KR)

( * ) Notice: Subject to any disclaimer, the term of this patent is extended or adjusted under 35 U.S.C. 154(b) by 438 days.

(21) Appl. No.: 15/307,627

(22) PCT Filed: May 8, 2015

(86) PCT No.: PCT/KR2015/004611
§ 371 (c)(1),
(2) Date: Oct. 28, 2016

(87) PCT Pub. No.: WO2015/170918
PCT Pub. Date: Nov. 12, 2015

(65) Prior Publication Data
US 2017/0047584 A1 Feb. 16, 2017

(30) Foreign Application Priority Data

May 9, 2014 (KR) .................. 10-2014-0055805
May 7, 2015 (KR) .................. 10-2015-0063721

(51) Int. Cl.
| | | |
|---|---|---|
| H01M 4/36 | (2006.01) | |
| H01M 4/04 | (2006.01) | |
| H01M 4/38 | (2006.01) | |
| H01M 4/48 | (2010.01) | |
| H01M 4/587 | (2010.01) | |
| H01M 4/62 | (2006.01) | |
| H01M 10/0525 | (2010.01) | |
| H01M 4/02 | (2006.01) | |

(52) U.S. Cl.
CPC ......... *H01M 4/366* (2013.01); *H01M 4/0471* (2013.01); *H01M 4/386* (2013.01); *H01M 4/483* (2013.01); *H01M 4/587* (2013.01); *H01M 4/625* (2013.01); *H01M 10/0525* (2013.01); *H01M 2004/021* (2013.01); *H01M 2004/027* (2013.01); *H01M 2220/30* (2013.01)

(58) Field of Classification Search
CPC ....... H01M 10/0525; H01M 2004/021; H01M 2004/027; H01M 2220/30; H01M 4/0471; H01M 4/366; H01M 4/386; H01M 4/483; H01M 4/587; H01M 4/625
See application file for complete search history.

(56) References Cited

U.S. PATENT DOCUMENTS

| | | |
|---|---|---|
| 2006/0134516 A1 | 6/2006 | Im et al. |
| 2010/0285359 A1 | 11/2010 | Hwang et al. |
| 2013/0004846 A1 | 1/2013 | Kim et al. |
| 2013/0252101 A1 | 9/2013 | Zhou et al. |
| 2014/0087255 A1 | 3/2014 | Kim et al. |
| 2014/0287315 A1* | 9/2014 | Troegel ............... H01M 4/0421 429/231.8 |

FOREIGN PATENT DOCUMENTS

| | | |
|---|---|---|
| KR | 100738054 B1 | 7/2007 |
| KR | 20100120919 A | 11/2010 |
| KR | 20130004536 A | 1/2013 |
| KR | 20130033733 A | 4/2013 |
| KR | 20130087969 A | 8/2013 |
| KR | 20140039603 A | 4/2014 |

OTHER PUBLICATIONS

Scientific & Technical Information Center (STIC) search results from Ossama Darwish, Jun. 19, 2018 (Year: 2018).*
Machine Translation of KR20130087969 in IDS dated Oct. 28, 2016 (Year: 2013).*
International Search Report from PCT/KR2015/004611, dated Jul. 24, 2015.

* cited by examiner

*Primary Examiner* — Victoria H Lynch
(74) *Attorney, Agent, or Firm* — Lerner, David, Littenberg, Krumholz & Mentlik, LLP

(57) ABSTRACT

Provided are a porous silicon-carbon composite, which includes a core including a plurality of active particles, a conductive material formed on at least a portion of surfaces of the active particles, first pores, and second pores, and a first shell layer which is coated on the core and includes graphene, wherein the active particles include a plurality of silicon particles, silicon oxide particles, or a combination thereof, the first pores are present in the core and are formed by agglomeration of the plurality of active particles, and the second pores are irregularly dispersed and present in the core, has an average particle diameter smaller than an average particle diameter of the active particles, and are spherical, a method of manufacturing the same, and a negative electrode and a lithium secondary battery including the porous silicon-carbon composite.

31 Claims, 20 Drawing Sheets

GRAPHENE-COATED POROUS SILICON-CARBON COMPOSITE AND METHOD OF MANUFACTURING THE SAME

CROSS-REFERENCE TO RELATED APPLICATIONS

This application is a national phase entry under 35 U.S.C. § 371 of International Application No. PCT/KR2015/004611, filed May 8, 2015, which claims priority to Korean Patent Application No. 10-2014-0055805, filed May 9, 2014 and Korean Patent Application No. 10-2015-0063721, filed May 7, 2015, the disclosures of which are incorporated herein by reference.

TECHNICAL FIELD

The present invention relates to a graphene-coated silicon-carbon composite and a method of manufacturing the same.

BACKGROUND ART

In line with recent miniaturization and lightweight trends in electronic devices, the miniaturization and weight reduction have also been required for batteries acting as a power source. Lithium-based secondary batteries have been commercialized as a battery that may be miniaturized, light weighted, and charged to high capacity, and the lithium-based secondary batteries have been used in portable electronic devices, such as small video cameras, mobile phones, and notebooks, and communication devices.

In general, a lithium secondary battery is composed of a positive electrode, a negative electrode, and an electrolyte, in which charge and discharge may be possible because lithium ions, which are discharged from a positive electrode active material by first charging, may act to transfer energy while moving between both electrodes, for example, the lithium ions are intercalated into a negative electrode active material, i.e., carbon particles, and deintercalated during discharging.

Since there is a continuous need for high-capacity batteries due to the development of portable electronic devices, research into high-capacity negative electrode materials, such as tin (Sn) and silicon (Si), which have significantly higher capacity per unit mass than that of carbon that is used as a typical negative electrode material, have been actively conducted. Among these negative electrode materials, it has been reported that Si is inexpensive and is a high-capacity negative electrode material having high capacity, for example, discharge capacity (about 4,200 mAh/g) about 10 times that of graphite as a commercial negative electrode material.

However, since Si is an insulator and the reduction of battery performance may occur due to a rapid volume expansion during a charge and discharge process, various accompanying side reactions, and the formation of an unstable solid electrolyte interface (SEI), this has been a great constraint in the commercialization of Si.

Recently, a technique of using a SiO—C composite as a Si-based negative electrode active material has been proposed. However, the SiO—C composite uses SiO as a precursor, requires a high-temperature heat treatment (about 700° C. to 1,000° C.) during a manufacturing process, and has technical difficulties in that its particle size must be reduced by mechanical and physical crushing as a subsequent process.

Thus, in order to address these limitations, there is an urgent need to develop a silicon-containing negative electrode active material which may compensate for low electrical conductivity of silicon, may simultaneously secure and maintain a conductive path, and may be used for a long period of time.

DISCLOSURE OF THE INVENTION

Technical Problem

An aspect of the present invention provides a porous silicon-carbon composite having compensated electrical conductivity and improved mechanical strength.

Another aspect of the present invention provides a method of manufacturing a porous silicon-carbon composite which may simply and efficiently manufacture the graphene-coated porous silicon-carbon composite.

Another aspect of the present invention provides a negative electrode active material including the porous silicon-carbon composite.

Another aspect of the present invention provides a negative electrode including the negative electrode active material, a conductive agent, and a binder, and a lithium secondary battery including the negative electrode.

Technical Solution

According to an aspect of the present invention, there is provided a porous silicon-carbon composite including: a core including a plurality of active particles, a conductive material formed on at least a portion of surfaces of the active particles, first pores, and second pores; and a first shell layer which is coated on the core and includes graphene, wherein the active particles include a plurality of silicon particles, silicon oxide particles, or a combination thereof, the first pores are present in the core and are formed by agglomeration of the plurality of active particles, and the second pores are irregularly dispersed and present in the core, has an average particle diameter smaller than an average particle diameter of the active particles, and are spherical.

According to another aspect of the present invention, there is provided a method of manufacturing a porous silicon-carbon composite including: preparing a first mixed solution in which silicon or silicon oxide particles, a conductive material, and a porogen are dispersed; dispersing graphene oxide in the first mixed solution to prepare a second mixed solution; spray drying the second mixed solution to prepare a composite including a core and a first shell layer; and sintering the composite to manufacture a porous silicon-carbon composite having a portion of a surface or an entire surface thereof coated with graphene.

According to another aspect of the present invention, there is provided a negative electrode active material including the porous silicon-carbon composite of the present invention.

According to another aspect of the present invention, there is provided a negative electrode including the negative electrode active material, a conductive agent, and a binder, and a lithium secondary battery including the negative electrode.

Advantageous Effects

According to the present invention, a porous silicon-carbon composite may be efficiently manufactured by a simple process, and since the graphene-coated porous silicon-carbon composite thus manufactured may secure and maintain an effective conductive path to improve electrical properties and electrical conductivity and to increase mechanical strength, the crushing of the composite in a rolling process during the preparation of an electrode may be prevented to guarantee its own performance.

Thus, a lithium secondary battery including the above electrode has good capacity retention as well as excellent discharge capacity.

MODE FOR CARRYING OUT THE INVENTION

Figure 1A:
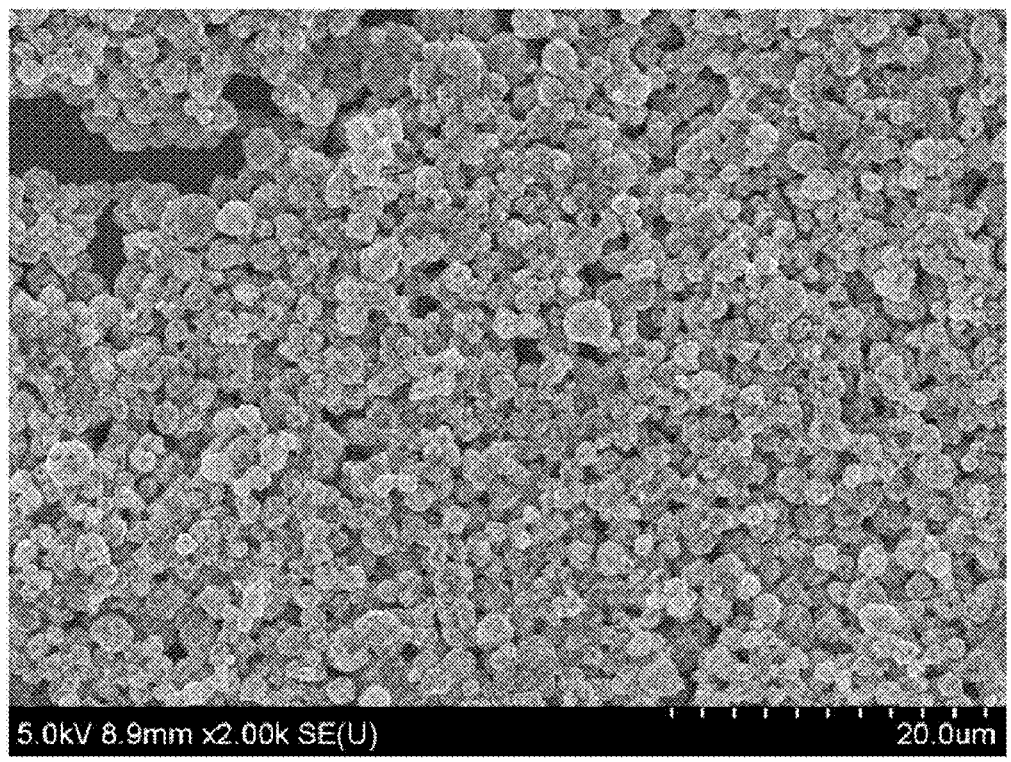
FIGS. 1A to 1C are scanning electron microscope (SEM) images of a graphene-coated porous silicon-carbon composite manufactured according to Example 1 of the present invention.

Hereinafter, the present invention will be described in more detail.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

A Si/C composite proposed earlier may provide high electrical conductivity to silicon, but may have a limitation in that carbon having brittle characteristics is crushed due to a volume expansion of the silicon generated during charge and discharge. With respect to a Si/graphene composite developed to improve the limitation, it is a simple mixture of the two materials or a large amount of dispersant may be used to form the composite or it only shows partial compositing. Also, a manufacturing method, which may easily mass produces the Si/graphene composite, is absent.

In order to address this limitation, in the present invention, carbon (graphene) having very high electrical conductivity (like metal) and excellent mechanical strength is used during the preparation of a Si/C or Si composite material to allow silicon to be contained in the carbon and to simultaneously contain pores configured to suppress the volume expansion of the silicon in a graphene shell, and thus, a porous silicon-carbon composite having an efficient conductive network is manufactured to attempt to provide a negative electrode active material, which may secure electrical capacitance and mechanical strength, and a lithium secondary battery including the negative electrode active material. In addition, the present invention aims at providing a method in which the composite may be easily manufactured in large quantities by a simple method without using a separate dispersant during the manufacture of the composite.

Porous Silicon-Carbon Composite

Specifically, an embodiment of the present invention provides a porous silicon-carbon composite including:

a core including a plurality of active particles, a conductive material formed on at least a portion of surfaces of the active particles, first pores, and second pores; and a first shell layer which is coated on the core and includes graphene, wherein the active particles include a plurality of silicon particles, silicon oxide particles, or a combination thereof, the first pores are present in the core and are formed by agglomeration of the plurality of active particles, and the second pores are irregularly dispersed and present in the core, has an average particle diameter smaller than an average particle diameter of the active particles, and are spherical.

First, in the porous silicon-carbon composite of the present invention, the active particles constituting the core may include a plurality of silicon (Si) particles, silicon oxide particles, or a silicon-based composite composed of a combination thereof as described above.

A typical silicon-based composite includes Si grains and amorphous $SiO_2$ grains at a ratio of $1-(x/2):(x/2)$, wherein, in this case, an overall composition of the silicon-based composite may be expressed by $SiO_x$ ($0<x\leq2$). That is, x is the number ratio of oxygen (O) atoms to Si atoms included in the silicon-based composite, wherein x may satisfy $0<x<2$ and, for example, may satisfy $0<x<1$. Specifically, in a case in which x exceeds 1, a swelling phenomenon of the negative electrode active material may be somewhat reduced in comparison to a case in which x does not exceed 1, but initial discharge capacity of the lithium secondary battery may be reduced. In the silicon-based composite, the more the amount of the Si increases, the more the amount of the $SiO_2$ is reduced and the more the amount of oxygen capable of binding to Si is reduced.

Also, an average particle diameter (D50) of the active particles is in a range of 3 nm to 900 nm, wherein, in a case in which the average particle diameter of the active particles is within the above range, stress of silicon due to a volume expansion of the active particles generated during charge and discharge may be reduced, reversible capacity is increased, and cycle life characteristics may be improved because the volume expansion is suppressed during a reaction with lithium. That is, in a case in which the diameter of the active particles is less than 3 nm, since a specific surface area may be excessively increased, a loss in the reversible capacity may occur. In a case in which the diameter of the active particles is greater than 900 nm, cracks and crushing may very easily occur in the silicon active material itself due to the stress caused by the volume expansion, and since the volume expansion during the reaction with lithium is increased due to the large diameter of the particles, the efficiency of the entire spherical particles in buffering the volume expansion is reduced.

Also, the active particles may be included in an amount of 10 wt % to 95 wt %, particularly, 50 wt % to 95%, based on a total weight of the core. In a case in which the amount of the active particles included is within the above range, the reversible capacity is increased and the buffering of the volume expansion is facilitated, and thus, the cycle life characteristics are improved.

Furthermore, in the porous silicon-carbon composite of the present invention, the conductive material is formed on at least a portion of the active particles in the composite to form a conductive network between the conductive materials or a plurality of composites adjacent and connected to the outside of the composite. That is, the conductive material may be formed and present in a network structure or thread structure in which the conductive materials are bonded and connected to each other, and may be present in the form of being combined with the surfaces of some active particles. Since the porous silicon-carbon composite of the present invention allows electrical contact between the silicon particles in the composite by including the conductive material in the inside thereof, the porous silicon-carbon composite of the present invention may achieve high capacity without a loss in capacity.

A typical example of the conductive material may be at least one selected from the group consisting of carbon nanotubes (CNT), graphene, and amorphous carbon.

Also, the conductive material may be included in an amount of 1 wt % to 30 wt % based on a total weight of the porous silicon-carbon composite. In a case in which the conductive material is used in an amount greater than the above amount, a decrease in capacity due to a decrease in the silicon active material and a decrease in efficiency due to an irreversible reaction of the carbon materials used may occur.

Also, in the porous silicon-carbon composite of the present invention, the core may include first pores and second pores.

The first and second pores may not only provide a buffer area for efficiently absorbing the volume expansion when the active particles react with lithium ions, but may also have an effect of improving mechanical strength of the porous silicon-carbon composite.

In this case, the first pore is present on the surface and inside of the core and may be formed by the agglomeration of the plurality of active particles. Specifically, the first pore is formed by being surrounded by the plurality of adjacent active particles, and may have a non-linear pore shape in which an outer surface of the first pore is formed along the surfaces of the plurality of adjacent active particles.

The first pore may have at least one form selected from an open-pore form, in which the pore is opened toward the outside of the core, and a closed-pore form in which the pore is not exposed to the outside of the core.

Also, the second pores are irregularly dispersed and present in the core, its average particle diameter is smaller than the average particle diameter of the active particles, and the second pore may have a spherical shape.

Specifically, the average particle diameter (D50) of the second pores may be in a range of 50 nm to 500 nm. In this case, the average particle diameter of the second pores denotes a diameter in a case that the second pore is present alone, wherein the second pores may be present in a shape in which the second pores are agglomerated to each other to have a diameter greater than the above average particle diameter range and, in this case, the second pores may be present in the form of a bubble, in which the spherical shapes are agglomerated, in addition to the spherical shape.

The second pore may also have at least one form selected from an open-pore form, in which the pore is opened toward the outside of the core, and a closed-pore form in which the pore is not exposed to the outside of the core.

Furthermore, a total volume of the first pores and the second pores may be in a range of 50 vol % to 300 vol % based on a total volume of the active particles of the core. In a case in which the total volume of the pores formed is within the above volume range, the mechanical strength of the composite may be improved by providing the buffer area caused by the reaction of the active particles with the lithium ions during the charge and discharge, and since conductivity of the lithium ions is good and packing density is high, capacity per volume of a negative electrode plate may be increased to improve the cycle life characteristics.

Also, in the porous silicon-carbon composite of the present invention, an average particle diameter (D50) of the core including the plurality of active particles, the conductive material formed on at least a portion of the surfaces of the active particles, the first pores, and the second pores may be in a range of 0.5 μm to 50 μm. In a case in which the average particle diameter of the core particle is within the above range, a uniform electrode may be prepared, and, in a case in which the average particle diameter of the core particle is smaller than the above range, a uniform electrode may be prepared, but a large amount of an electrolyte solution may be used and a side reaction may occur due to an increased specific surface area. In a case in which the average particle diameter of the core particle is larger than the above range, a non-uniform electrode may be prepared during the preparation of the electrode.

In the porous silicon-carbon composite of the present invention, the active particles may further include a carbon coating layer on the surface thereof in order to further improve the electrical conductivity.

In this case, the carbon coating layer may be formed by performing a heat treatment (annealing) on a first carbon precursor in a state of being combined with the silicon or silicon oxide particles.

The carbon coating layer may be included in an amount of 1 wt % to 40 wt % based on a total weight of the porous silicon-carbon composite, and, in a case in which the amount of the coated carbon coating layer is within the above range, a binding force between the active particles and the carbon coating layer may be increased to further stabilize a structure of the core particle, and the silicon particles may be effectively electrically activated by forming a good electrical conductivity network.

In this case, the first carbon precursor is a water-soluble material, wherein typical examples of the first carbon precursor may be one selected from the group consisting of glucose, sucrose, gum arabic, tannic acid, lignosulfonate, aromatic oxides including poly-aromatic oxide, saccharides, and polyphenols, or a combination of two or more thereof.

Also, in the porous silicon-carbon composite of the present invention, the core may further include a polymer material.

The polymer material is a material that is pyrolyzed in a sintering process, wherein typical examples of the polymer material may be a single material selected from the group consisting of a polystyrene monomer, a polystyrene oligomer, polyacrylonitrile, polyvinylidene fluoride, a copolymer of polyvinylidene fluoride and polyhexafluoropyrene, polytetrafluoroethylene, polyhexafluoropropylene, polyethylene oxide, polypropylene oxide, polyphosphazene, polysiloxane, polyvinyl acetate, polyvinyl alcohol, polymethyl methacrylate, polyacrylic acid, polymethacrylic acid, a styrene-butadiene rubber, a nitrile-butadiene rubber, polyethylene, polypropylene, polybutylene, and polycarbonate, or a mixture of two or more thereof.

Furthermore, a volume ratio of the silicon or silicon oxide particles to the polymer material as a porogen may be in a range of 1:0.5 to 1:3 in consideration of density, and if the volume ratio is converted to a weight ratio, the polymer material may be included in an amount of about 50 wt % to about 300 wt % (amount ratio before the annealing) based on a weight of silicon. In a case in which the amount of the polymer material included is within the above ratio range, the polymer material may further increase the mechanical strength of the composite by forming sufficient crosslinks in the composite and may form pores which may accommodate volume-expanded silicon.

Also, the porous silicon-carbon composite of the present invention may include a first shell layer including graphene.

In this case, the first shell layer is formed in a single-layer or multilayer structure including one or more graphene layers, and may be formed by being stacked in a concentric direction along the surface of the core particle. The movement of lithium ions and the electrical conductivity may be improved by the first shell layer.

A thickness of the first shell layer may be in a range of 0.3 nm to 300 nm. In a case in which the thickness is within the above range, the first shell layer may protect the core particle from the electrolyte solution during the charge and discharge and may suppress the volume expansion of the core particle, and since the movement of the lithium ions may be facilitated to sufficiently generate the reaction of the core particles with lithium, the reversible capacity may be increased.

The first shell layer may be formed by using a carbon-based material such as graphene oxide. In this case, a preparation method of the graphene oxide is not particularly limited, but the graphene oxide may be prepared by oxidizing graphite using a chemical exfoliation method for the mass production of graphene.

Also, an average particle diameter (D50) of the porous silicon-carbon composite of the present invention may be in a range of 0.5 μm to 55 μm. In a case in which the average particle diameter (D50) of the porous silicon-carbon composite is within the above range, a uniform electrode may be prepared, and, in a case in which the average particle diameter of the porous silicon-carbon composite is smaller than the above range, a uniform electrode may be prepared, but a large amount of the electrolyte solution may be used and a side reaction may occur due to an increased specific surface area. In a case in which the average particle diameter of the porous silicon-carbon composite is larger than the above range, a non-uniform electrode may be prepared during the preparation of the electrode.

The porous silicon-carbon composite of the present invention may further include a second shell layer coated on the first shell layer.

The second shell layer may be formed of a composite coating layer which is formed by combination of two or more materials selected from the group consisting of carbon, rubber, and carbon nanotubes.

The second shell layer may further increase the mechanical strength of the porous silicon-carbon composite of the present invention. As a result, the second shell layer may prevent the crushing of the porous silicon-carbon composite particles of the present invention during a process of preparing an electrode active material slurry for coating an electrode collector including the porous silicon-carbon composite or a process of preparing an electrode by coating the collector with the slurry and then rolling the coated collector. With respect to the composite in which the second shell layer is not formed, since the mechanical strength is relatively low, some particles are broken during the preparation process of the electrode, and thus, the performance of the composite may not be perfectly achieved.

Method of Manufacturing Porous Silicon-Carbon Composite

Also, an embodiment of the present invention provides a method of manufacturing the porous silicon-carbon composite of the present invention including:

preparing a first mixed solution in which silicon or silicon oxide particles, a conductive material, and a porogen are dispersed;

dispersing graphene oxide in the first mixed solution to prepare a second mixed solution;

spray drying the second mixed solution to prepare a composite including a core and a first shell layer; and sintering the composite to manufacture a porous silicon-carbon composite having a portion of a surface or an entire surface thereof coated with graphene.

In the method of the present invention, the same components as described above may be used as the silicon or silicon oxide particles and the conductive material.

In the method of the present invention, the porogen induces the formation of pores and is used to form a plurality of pores in the inside and outside of the composite.

In an embodiment of the present invention, the porogen may include a polymer material that is pyrolyzed at high temperature, and a type of the polymer material is not particularly limited and the polymer material may be differently used according to the size or shape of the pores to be formed. Specifically, a polymer material in the form of a bead may be used to form a spherical second pore.

Specifically, typical examples of the polymer material may be a single material selected from the group consisting of a polystyrene monomer, a polystyrene oligomer, polyacrylonitrile, polyvinylidene fluoride, a copolymer of polyvinylidene fluoride and polyhexafluoropyrene, polytetrafluoroethylene, polyhexafluoropropylene, polyethylene oxide, polypropylene oxide, polyphosphazene, polysiloxane, polyvinyl acetate, polyvinyl alcohol, polymethyl methacrylate, polyacrylic acid, polymethacrylic acid, a styrene-butadiene rubber, a nitrile-butadiene rubber, polyethylene, polypropylene, polybutylene, and polycarbonate, or a mixture of two or more thereof.

Since the polymer material pyrolyzed at high temperature is used as the porogen in the method of the present invention, pores are formed in positions where the polymer material is disposed while a portion of the polymer material is removed by the heat treatment in a subsequent sintering process after the polymer material is mixed with the active particles.

Accordingly, the plurality of second pores are formed in the inside or surface of the composite. The second pores formed in the porous silicon-carbon composite by the porogen may provide a buffer area with respect to the volume expansion of the silicon particles, and, as a result, the mechanical strength of the composite is improved to prevent the crushing of the composite during rolling.

The second pore may have at least one form selected from an open-pore form, in which the pore is opened toward the outside of the composite, and a closed-pore form, in which the pore is not exposed to the outside and is formed only in the inside of the composite, according to the position where the polymer before the pyrolysis is present.

In this case, when a particle diameter of the polymer material is large, the diameter of the pore is increased, and when the particle diameter of the polymer material is small, the diameter of the pore is decreased. Also, a size distribution of the pores may be adjusted according to a size distribution of the polymer material.

According to an embodiment of the present invention, an average particle diameter (D50) of the polymer material may be in a range of 50 nm to 500 nm. The reason for this is to randomly provide pores having an average diameter smaller than the average diameter of the active particles and larger than that of the first pores generated between the active particles, and thus, solid composite particles may be prepared in which porosity may be freely adjusted.

Also, when the polymer material is added in a relative large amount based on the weight of the porous silicon-carbon composite, an amount of pores is increased and, when the polymer material is added in a relative small amount, the amount of the pores may be decreased, wherein, according to an embodiment of the present invention, a volume ratio of the silicon or silicon oxide particles to the porogen may be in a range of 1:0.5 to 1:3. In a case in which the porogen is added in a volume ratio of greater than 1:3, since the mechanical strength of the finally manufactured composite is low, the composite may be broken during a rolling process for the preparation of the electrode, and, in a case in which the porogen is added in a volume ratio of less than 1:0.5, since pores are not appropriately formed, a sufficient buffer area may not be provided.

In the method of the present invention, a solvent used to prepare the first mixed solution and the second mixed solution may be one selected from the group consisting of water, alcohol, distilled water, N-methyl-2-pyrrolidone (NMP), dimethyl sulfoxide (DMSO), acetonitrile, acetone, tetrahydrofuran (THF), diethyl ether, toluene, and 1,2-dichlorobenzene, or a combination of two or more thereof, and the solvent, for example, may be water or a mixture of ethanol and water.

Also, in the method of the present invention, a stirring process may be repeated several times in order for the reactants to be well dispersed in the solvent during the preparation of the first and second mixed solutions. In this case, the stirring process may be performed using ultrasonication or a mechanical homogenizer. In this case, since the graphene oxide may function as a dispersant during the preparation of the mixed solution, it is not necessary to separately add a dispersant for the dispersion, and thus, the process is not only simplified, but economic efficiency is also improved.

Furthermore, in the method of the present invention, a first carbon precursor configured to function as a binder and a carbon coating-forming agent may be further added during the preparation of the first mixed solution.

The first carbon precursor may act as a backbone in the composite, wherein a material, which may be dissolved in a dispersion solution and may be carbonized by the sintering process, may be used.

Specifically, the first carbon precursor may be a water-soluble material when water is used as the dispersion solution, and typical examples of the first carbon precursor may be a single material selected from the group consisting of glucose, sucrose, gum arabic, tannic acid, lignosulfonate, aromatic oxides including poly-aromatic oxide, saccharides, and polyphenols, or a mixture of two or more thereof.

In this case, when the first carbon precursor is used, a weight ratio of the first carbon precursor:the silicon or silicon oxide particles may be in a range of 50:50 to 5:95.

Also, in the method of the present invention, when the second mixed solution is spray-dried, a composite precursor including the core, which is formed by the agglomeration of the silicon or silicon oxide primary particles, the conductive material, the carbon precursor, and the porogen, and the first shell layer formed of graphene oxide, which is coated on a portion of a surface or an entire surface of the core, is prepared.

In this case, in the method of the present invention, the spray drying may be performed by a general drying method including rotary spraying, nozzle spraying, ultrasonic spraying, or a combination thereof, and a flow of the solution during the spraying, a spray pressure, and a spray speed may be appropriately adjusted according to the spray drying method and the desired average particle diameter of the porous silicon-carbon composite. Specifically, the spray drying may be performed at an inlet temperature ranging from 100° C. to 250° C., and for example, may be performed at an inlet temperature ranging from 150° C. to 200° C.

An average particle diameter of the porous silicon-carbon composite prepared by the method of the present invention may be changed according to the spray drying method and equipment, but, particularly, the average particle diameter may be in a range of about 0.5 µm to about 50 µm.

Also, in the method of the present invention, the sintering temperature may be in a range of 400° C. to 1,000° C.

Since the graphene oxide coated on the portion of the surface or the entire surface of the composite precursor is reduced and carbonized during the sintering process, a porous silicon-carbon composite having a portion of a surface or an entire surface thereof coated with graphene may be manufactured.

Also, the second pores may be formed in the composite by removing a portion of the porogen while the polymer material as the porogen is pyrolyzed during the sintering process.

Furthermore, the method of the present invention may further include forming a composite coating layer on the surface of the composite, after the manufacture of the porous silicon-carbon composite.

The composite coating layer may be formed by one selected from the group consisting of a second carbon precursor, a rubber precursor, and carbon nanotubes, or a combination of two or more materials thereof.

In this case, examples of the second carbon precursor may be one selected from the group consisting of glucose, sucrose, gum arabic, tannic acid, lignosulfonate, poly-aromatic oxide, pitch, saccharides, and polyphenols, or a combination of two or more thereof.

Also, examples of the rubber precursor may be one selected from the group consisting of styrene butadiene styrene, a styrene butadiene rubber, an acrylonitrile-butadiene rubber, and polychloroprene, or a combination of two or more thereof.

Furthermore, examples of the carbon nanotubes may be one selected from the group consisting of single-walled carbon nanotubes, multi-walled carbon nanotubes, and carbon nanofibers, or a combination of two or more thereof.

Since the composite coating layer improves the mechanical strength of the porous silicon composite, the composite coating layer functions to prevent the crushing of the silicon-carbon composite particles when the slurry for coating an electrode collector is prepared by using the silicon-carbon composite as an electrode active material or during the process of preparing the electrode by rolling the slurry.

As described above, in the present invention, a graphene-coated porous silicon-carbon composite may be simply and efficiently manufactured by the above method. In particular, according to the present invention, since a process of separately coating or forming graphene on the composite is not required and it is not necessary to use a separate dispersant during the preparation of the dispersant solution, a process of manufacturing the composite is simple and highly economically efficient.

Also, the composite manufactured by the above process may secure additional electrical conductivity due to the graphene coated on the portion of the surface or the entire surface thereof, and, as a result, stable capacity retention may be obtained by forming a stable solid electrolyte interface (SEI) on the outside of the composite during the charge and discharge.

Negative Electrode Active Material and Negative Electrode, and Lithium Secondary Battery Including the Same Also, the present invention provides a negative electrode active material including the graphene-coated porous silicon-carbon composite which is manufactured by a series of steps described above.

Furthermore, in the present invention, the negative electrode active material of the present invention is mixed and stirred with a solvent as well as a binder, a conductive agent, and a dispersant, if necessary, to prepare a slurry, and a current collector is then coated with the slurry and rolled to prepare a negative electrode.

In this case, the silicon-carbon composite of the present invention may be used alone as the negative electrode active material, or may be used by being mixed with a negative electrode active material typically used. The typically used negative electrode active material may be one selected from the group consisting of graphite, soft carbon, hard carbon, and lithium titanium oxide, or a mixture of two or more thereof.

N-methyl-2-pyrrolidone, acetone, or water may be used as the solvent.

Also, examples of the binder may be a vinylidene fluoride-hexafluoropropylene copolymer (PVDF-co-HEP), polyvinylidene fluoride, polyacrylonitrile, polymethylmethacrylate, polyvinyl alcohol, carboxymethyl cellulose (CMC), starch, hydroxypropyl cellulose, regenerated cellulose, polyvinylpyrrolidone, tetrafluoroethylene, polyethylene, polypropylene, polyacrylate, an ethylene-propylene-diene monomer (EPDM), a sulfonated EPDM, a styrene-butadiene rubber (SBR), a fluoro rubber, or various copolymers.

Furthermore, the conductive agent is not particularly limited as long as it has conductivity without causing adverse chemical changes in the battery. Conductive materials, for example, graphite such as carbon nanotubes, graphene, natural graphite, or artificial graphite; a carbon material such as carbon black, acetylene black, Ketjen black, channel black, furnace black, lamp black, and thermal black; conductive fibers such as carbon fibers or metal fibers; metal powder such as fluorocarbon powder, aluminum powder, and nickel powder; conductive whiskers such as zinc oxide whiskers and potassium titanate whiskers; conductive metal oxides such as titanium oxide; and polyphenylene derivatives, may be used.

An aqueous-based dispersant or an organic dispersant, such as N-methyl-2-pyrrolidone, may be used as the dispersant.

The porous silicon-carbon composite is not crushed even after the negative electrode active material according to the present invention is coated on the current collector. A ratio, in which the porous silicon-carbon composite particles are crushed after the negative electrode active material according to the present invention is coated on the current collector, is less than 50% based on the number of the total composite particles.

That is, when a negative electrode material mixture is prepared by including the composite according to the present invention and the current collector is coated with the negative electrode material mixture, the composite may have a somewhat depressed shape, but is not crushed. Thus, it is easy to achieve and maintain unique performance of the composite in a finally prepared lithium secondary battery.

In contrast, with respect to a composite manufactured according to the related art, since its mechanical strength is low, the composite is mostly crushed when a negative electrode material mixture in the form of a slurry is prepared and then coated on a current collector, and thus, it may be difficult to achieve and maintain unique performance of the composite in a battery.

Also, in an embodiment of the present invention, provided is a lithium secondary battery including a positive electrode, a separator, the negative electrode, and an electrolyte.

In this case, similar to the preparation of the negative electrode as described above, a positive electrode active material, a conductive agent, a binder, and a solvent are mixed to prepare a slurry, and a positive electrode may then be prepared by directly coating a metal collector with the slurry or by casting the slurry on a separate support and laminating a positive electrode active material film separated from the support on a metal collector.

Examples of the positive electrode active material may be a layered compound, such as lithium cobalt oxide ($LiCoO_2$) or lithium nickel oxide ($LiNiO_2$), or a compound substituted with one or more transition metals; lithium manganese oxides such as $Li_{1+y}Mn_{2-y}O_4$ (where y is an integer of 0 to 0.33), $LiMnO_3$, $LiMn_2O_3$, and $LiMnO_2$; lithium copper oxide ($Li_2CuO_2$); vanadium oxides such as $LiV_3O_8$, $LiFe_3O_4$, $V_2O_5$, and $Cu_2V_2O_7$; nickel (Ni)-site type lithium nickel oxide expressed by a chemical formula of $LiNi_{1-y}M_yO_2$ (where M is cobalt (Co), manganese (Mn), aluminum (Al), copper (Cu), iron (Fe), magnesium (Mg), boron (B), or gallium (Ga), and y is an integer of 0.01 to 0.3); lithium manganese complex oxide expressed by a chemical formula of $LiMn_{2-y}M_yO_2$ (where M is cobalt (Co), nickel (Ni), Fe, chromium (Cr), zinc (Zn), or tantalum (Ta), and y is an integer of 0.01 to 0.1) or $Li_2Mn_3MO_8$ (where M is Fe, Co, Ni, Cu, or Zn); and $LiMn_2O_4$ having a part of lithium (Li) being substituted with alkaline earth metal ions. However, the positive electrode active material is not limited thereto.

A typical porous polymer film used as a typical separator, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, may be used alone or by being laminated as the separator. A typical porous nonwoven fabric, for example, a nonwoven fabric formed of high melting point glass fibers or polyethylene terephthalate fibers may be used, but the separator is not limited thereto.

In an electrolyte solution used in the present invention, a lithium salt, which may be included as the electrolyte, may be used without limitation so long as it is typically used in an electrolyte solution for a secondary battery. For example, any one selected from the group consisting of $F^-$, $Cl^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$ or a mixture of two or more thereof may be used as an anion of the lithium salt.

In the electrolyte solution used in the present invention, an organic solvent included in the electrolyte solution may be used without limitation so long as it is typically used, and typically, any one selected from the group consisting of propylene carbonate, ethylene carbonate, diethyl carbonate, dimethyl carbonate, ethylmethyl carbonate, methylpropyl carbonate, dipropyl carbonate, dimethyl sulfoxide, acetonitrile, dimethoxyethane, diethoxyethane, vinylene carbonate, sulfolane, γ-butyrolactone, propylene sulfite, and tetrahydrofuran, or a mixture of two or more thereof may be used.

In particular, ethylene carbonate and propylene carbonate, ring-type carbonates among the carbonate-based organic solvents, well dissociate the lithium salt in the electrolyte solution due to high dielectric constants as high-viscosity organic solvents, and thus, the ring-type carbonate may be used. Since an electrolyte solution having high electrical conductivity may be prepared when the ring-type carbonate is mixed with low-viscosity, low-dielectric constant linear carbonate, such as dimethyl carbonate and diethyl carbonate, in an appropriate ratio, the mixed carbonate, for example, may be used.

Selectively, the electrolyte solution according to the present invention may further include an additive, such as an overcharge inhibitor, included in a typical electrolyte solution.

A separator is disposed between the positive electrode and the negative electrode to form a battery structure, the battery structure is wound or folded to put in a cylindrical battery case or prismatic battery case, and then the electrolyte is injected thereinto to prepare a secondary battery. Also, the battery structure is stacked in a bi-cell structure, the structure is impregnated with the electrolyte solution, and a secondary battery is then completed when the product thus obtained is put in a pouch and sealed.

The negative electrode including the graphene-coated porous silicon-carbon composite of the present invention and the lithium secondary battery including the negative electrode exhibit high discharge capacity and good capacity retention. The reason for this is that the electrical conductivity is further improved due to the graphene coated on the portion of the surface or the entire surface of the composite and a stable SEI is formed on the outside of the composite during the charge and discharge of the battery. Thus, the lithium secondary battery including the composite according to the present invention may obtain stable capacity retention.

Also, since the method of manufacturing a graphene-coated porous silicon-carbon composite of the present invention is simple and efficient in comparison to the related art in terms of the fact that a separate dispersant is not required during the preparation of the dispersion solution and a graphene-coated porous silicon-carbon composite may be manufactured in only two steps without a separate process of coating or forming a graphene layer, its economic efficiency is high.

EXAMPLES

Hereinafter, the present invention will be described in detail, according to specific examples. The invention may, however, be embodied in many different forms and the scope of the present invention is not limited to the embodiments set forth herein.

Manufacture of Porous Silicon-Carbon Composite

Example 1: Manufacture of Si/CNT/PS/Graphene-Containing Composite 7 g of Si powder having a diameter of 250 nm, as active particles, was added to an aqueous dispersion in which 0.2 g of carbon nanotubes (hereinafter, referred to as "CNT") having a diameter of 3 μm, as a conductive material, was dispersed in 500 g of water, and a solution, in which Si particles were dispersed, was then prepared using a mechanical homogenizer and ultrasonication. 7 g of polystyrene beads having an average particle diameter of 200 nm was added as a porogen to the mixed solution and then mixed using a homogenizer to prepare a first mixed solution.

Subsequently, 7 g of a graphene oxide paste having a concentration of 0.1 wt % was added to the first mixed solution to prepare a second mixed solution.

The second mixed solution was stirred at 100° C. for 3 hours.

A graphene oxide-coated Si/C composite precursor was prepared by spray drying the second mixed solution using a spray dryer (model: B-290) by Büchi Labortechnika AG under conditions including an inlet temperature of 180° C., an aspirator at 100%, a pump at 12%, and an external nitrogen gas pressure of 60 on a gauge attached to the spray dryer, and then transferred to an alumina boat. The alumina boat was disposed in the middle of a tube furnace equipped with a quartz tube having a length of 80 cm and an inner diameter of 4.8 cm, a temperature of the tube furnace was increased to 700° C. at a rate of 10° C./min under argon (Ar) gas, and the graphene oxide-coated Si/C composite precursor was then sintered while maintaining the temperature for 2 hours.

As a result, a porous silicon-carbon composite was manufactured in which a total volume of first pores and second pores was about 200 vol % based on a total volume of the active particles, an average particle diameter of the second pores was 200 nm, an average particle diameter (D50) of a core was in a range of 0.5 μm to 50 μm, and an average particle diameter (D50) of the composite was 0.5 μm to 55 μm.

Figure 1B:
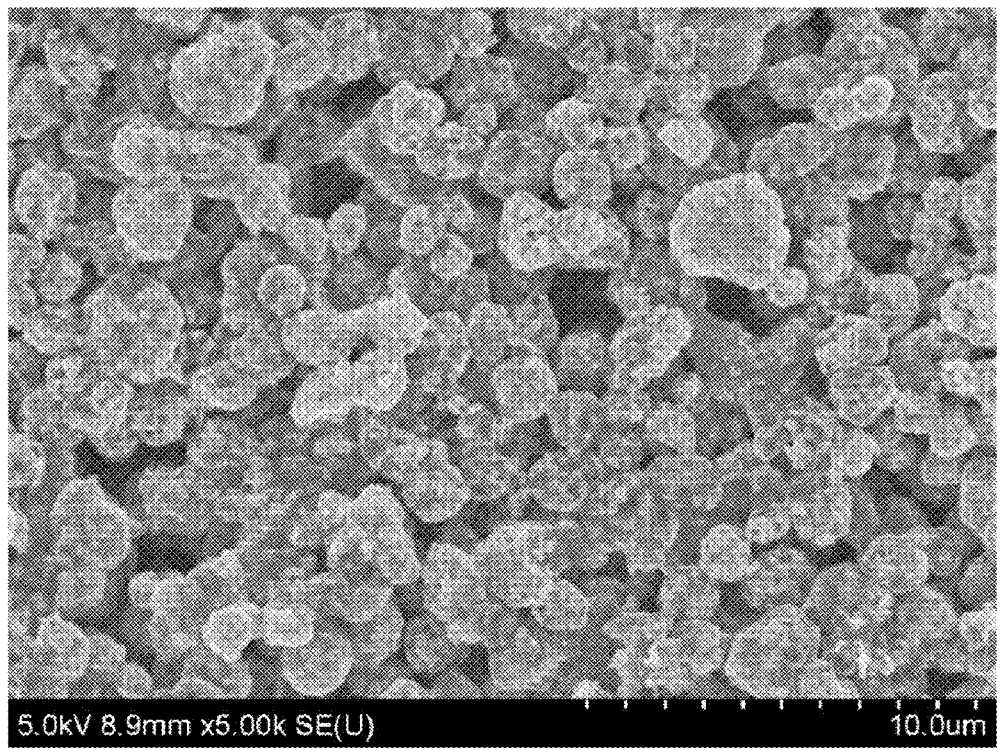
Figure 1C:
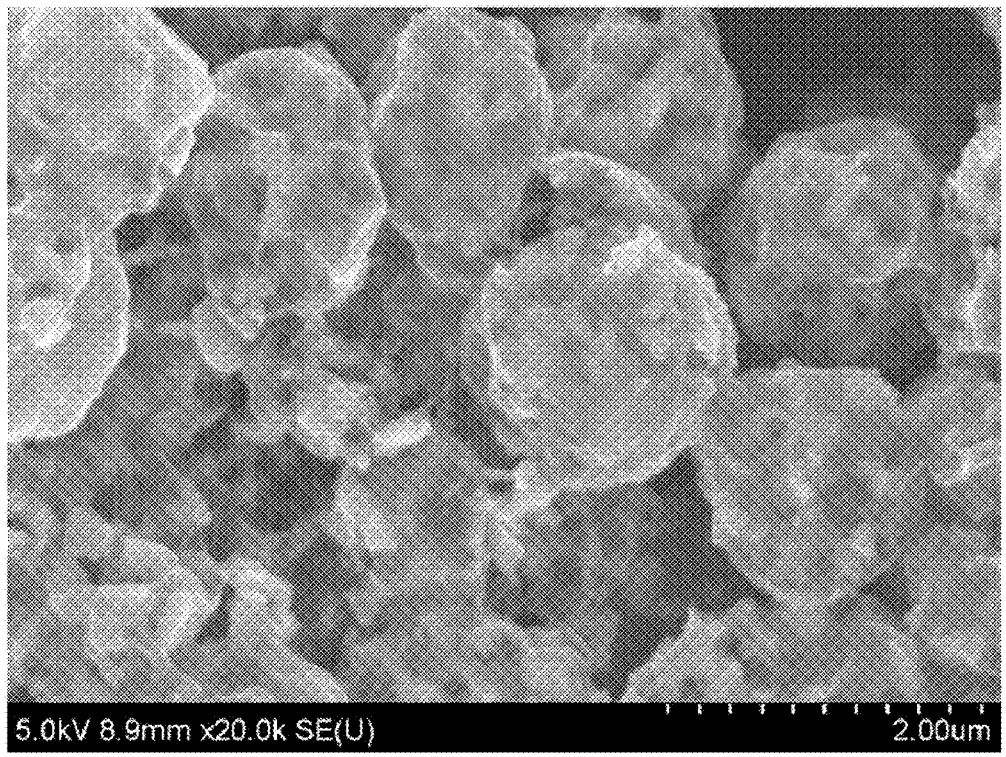

Scanning electron microscope (SEM) images of the graphene-coated porous Si/C composite manufactured are as illustrated in FIGS. 1A to 1C. Referring to FIGS. 1A to 1C, It may be confirmed that the composite including a plurality of pores was coated with graphene.

Example 2: Manufacture of Si/C/CNT/PS/Graphene-Containing Composite 7 g of Si powder having a diameter of 100 nm and 0.7 g of lignosulfonate, as a first carbon precursor, were added to an aqueous dispersion in which 0.2 g of carbon nanotubes (CNT) having a diameter of 3 µm, as a conductive material, was dispersed in 800 g of water, and then stirred for 30 minutes to prepare a solution, in which Si particles were dispersed, using a mechanical homogenizer and ultrasonication. 7 g of polystyrene beads having an average particle diameter of 200 nm was added as a porogen to the mixed solution and then mixed using a homogenizer to prepare a first mixed solution.

Subsequently, 7 g of a graphene oxide paste having a concentration of 0.1 wt % was added to the first mixed solution to prepare a second mixed solution.

Next, a graphene oxide-coated Si/C composite precursor was prepared by spray drying the second mixed solution using a B-290 mini spray dryer by Büchi Labortechnika AG at an inlet temperature of 180° C. and then transferred to an alumina boat. The alumina boat was disposed in the middle of a tube furnace equipped with a quartz tube having a length of 80 cm and an inner diameter of 4.8 cm, a temperature of the tube furnace was increased to 700° C. at a rate of 10° C./min under argon (Ar) gas, and the graphene oxide-coated Si/C composite precursor was then sintered while maintaining the temperature for 2 hours.

As a result, a porous silicon-carbon composite was manufactured in which a total volume of first pores and second pores was about 200 vol % based on a total volume of the active particles of a core, an average particle diameter of the second pores was 200 nm, an average particle diameter (D50) of the core was in a range of 0.5 µm to 50 µm, and an average particle diameter (D50) of the composite was 0.5 µm to 55 µm.

Figure 2A:
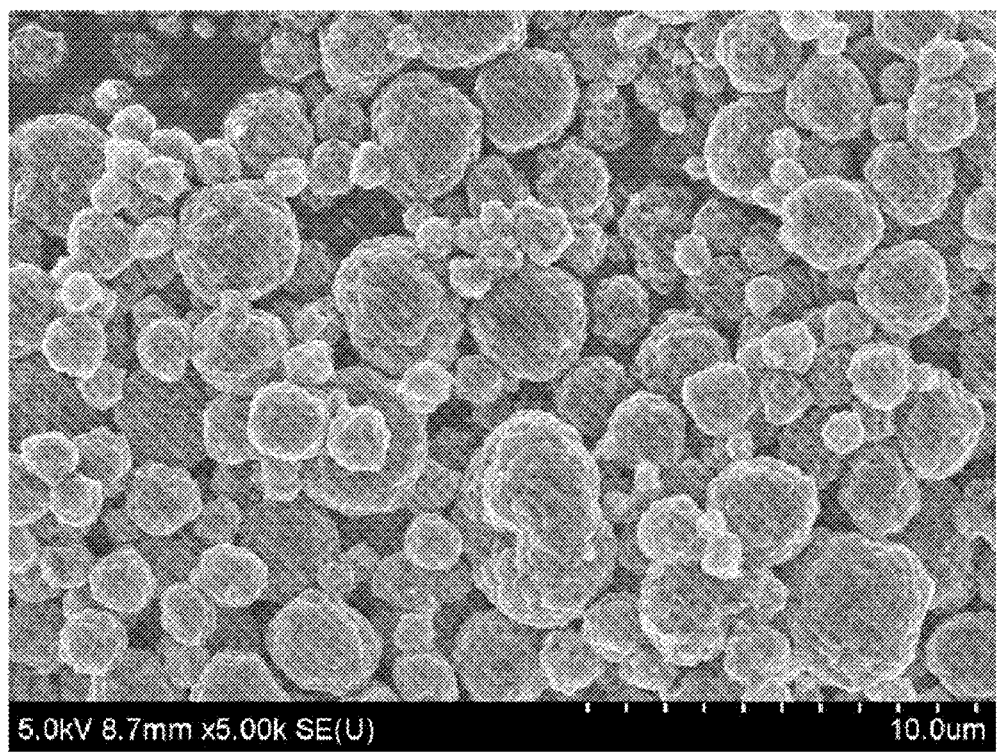
FIGS. 2A to 2C are SEM images of a graphene-coated porous silicon-carbon composite manufactured according to Example 2 of the present invention.
Figure 2B:
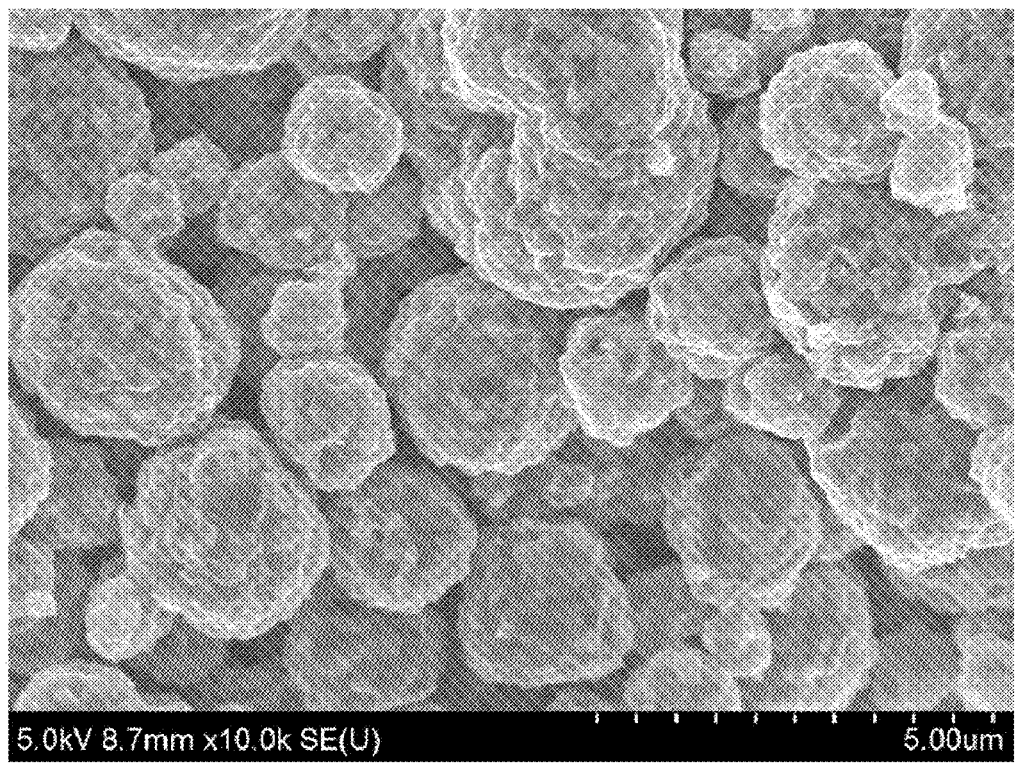
Figure 2C:
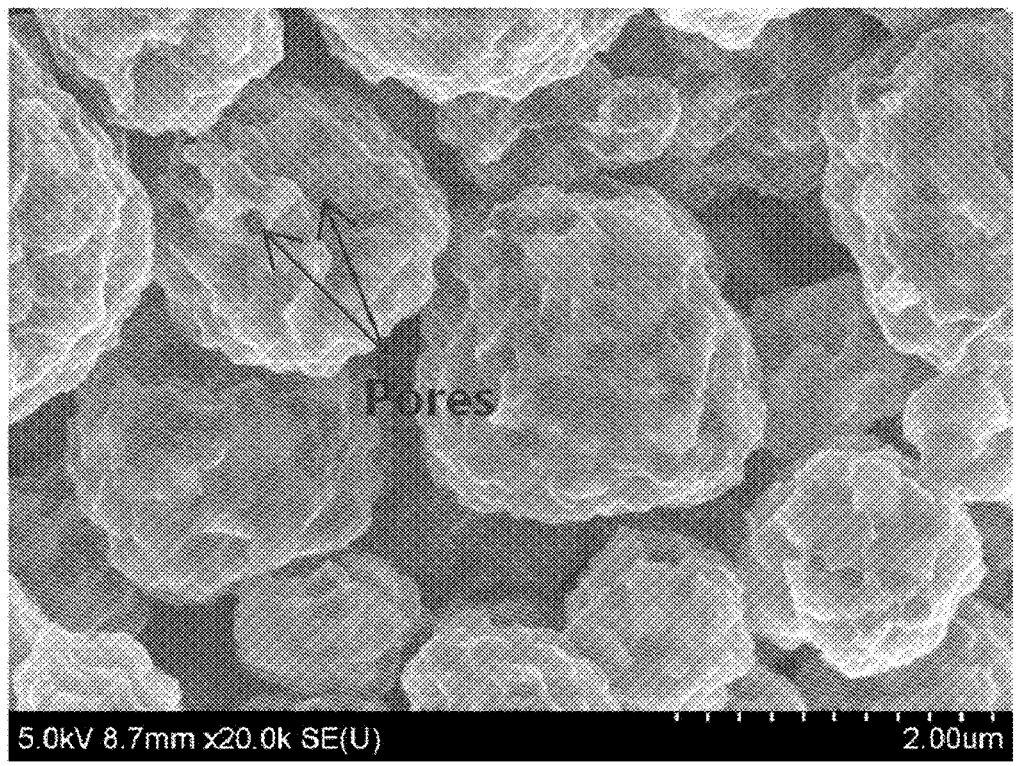

SEM images of the graphene-coated porous Si/C composite manufactured are as illustrated in FIGS. 2A to 2C. Referring to FIGS. 2A to 2C, it may be confirmed that the composite including a plurality of pores was coated with graphene.

Example 3: Manufacture of Si/C/CNT/PS/Graphene-Containing Composite 7 g of Si powder having a diameter of 100 nm and 2.1 g of poly-aromatic oxide, as a first carbon precursor, were added to an aqueous dispersion in which 0.2 g of carbon nanotubes (CNT) having a diameter of 3 µm, as a conductive material, was dispersed in 800 g of water, and then stirred for 30 minutes to prepare a solution, in which Si particles were dispersed, using a mechanical homogenizer and ultrasonication. 7 g of polystyrene beads having an average particle diameter of 200 nm was added as a porogen to the mixed solution and then mixed using a homogenizer to prepare a first mixed solution.

Subsequently, 7 g of a graphene oxide paste having a concentration of 0.1 wt % was added to the first mixed solution to prepare a second mixed solution.

Next, a graphene oxide-coated Si/C composite precursor was prepared by spray drying the second mixed solution using a B-290 mini spray dryer by Büchi Labortechnika AG at an inlet temperature of 180° C. and then transferred to an alumina boat. The alumina boat was disposed in the middle of a tube furnace equipped with a quartz tube having a length of 80 cm and an inner diameter of 4.8 cm, a temperature of the tube furnace was increased to 700° C. at a rate of 10° C./min under argon (Ar) gas, and the graphene oxide-coated Si/C composite precursor was then sintered while maintaining the temperature for 2 hours.

As a result, a porous silicon-carbon composite was manufactured in which a total volume of first pores and second pores was about 200 vol % based on a total volume of the active particles of a core, an average particle diameter of the second pores was 200 nm, an average particle diameter (D50) of the core was in a range of 0.5 µm to 50 µm, and an average particle diameter (D50) of the composite was 0.5 µm to 55 µm.

Figure 3:
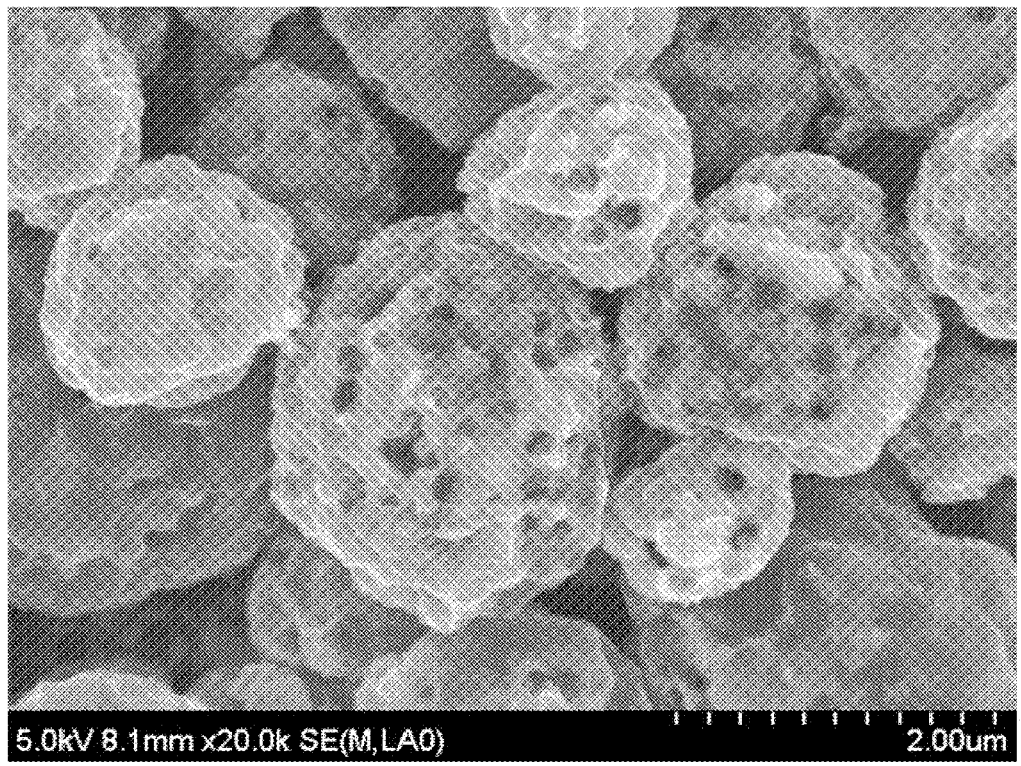
FIG. 3 is an SEM image of a graphene-coated porous silicon-carbon composite manufactured according to Example 3 of the present invention.

An SEM image of the graphene-coated porous Si/C composite manufactured is as illustrated in FIG. 3. Referring to FIG. 3, it may be confirmed that the composite including a plurality of pores was coated with graphene.

Example 4: Manufacture of Si/C/CNT/PS/Graphene/Composite Coating Layer-Containing Composite 7 g of Si powder having a diameter of 100 nm and 2.1 g of polyaromatic oxide, as a first carbon precursor, were added to an aqueous dispersion in which 0.2 g of carbon nanotubes (CNT) having a diameter of 3 µm, as a conductive material, was dispersed in 800 g of water, and then stirred for 30 minutes to prepare a solution, in which Si particles were dispersed, using a mechanical homogenizer and ultrasonication. 7 g of polystyrene beads having an average particle diameter of 200 nm was added as a porogen to the mixed solution and then mixed using a homogenizer to prepare a first mixed solution.

Subsequently, 35 g of a graphene oxide paste having a concentration of 2 wt % was added to the first mixed solution to prepare a second mixed solution.

Next, a graphene oxide-coated Si/C composite precursor was prepared by spray drying the second mixed solution using a B-290 mini spray dryer by Büchi Labortechnika AG at an inlet temperature of 180° C. and then transferred to an alumina boat. The alumina boat was disposed in the middle of a tube furnace equipped with a quartz tube having a length of 80 cm and an inner diameter of 4.8 cm, a temperature of the tube furnace was increased to 700° C. at a rate of 10° C./min under argon (Ar) gas, and the graphene oxide-coated Si/C composite precursor was then sintered to manufacture a composite while maintaining the temperature for 2 hours.

Subsequently, a precursor composition composed of pitch/styrene butadiene styrene (SBS) rubber/CNT was introduced into the manufactured porous Si/C composite at a ratio of 5 wt %/7 wt %/3 wt % based on a weight of Si in the composite by the following method.

125 mg of CNT (ACN Co. Ltd., size: 1 to 3 µm) was added to toluene, the mixture was subjected to bath sonication for 30 minutes, SBS and pitch were added to the mixture and homogenized at 5,000 rpm for 30 minutes to prepare a solution, the manufactured porous Si/C composite was coated with the solution, and dry particles were finally obtained by using a rotary evaporator.

After the particles complex-coated by the above method were transferred to an alumina boat, the alumina boat was disposed in the middle of a tube furnace equipped with a quartz tube having a length of 80 cm and an inner diameter of 4.8 cm, a temperature of the tube furnace was increased to 600° C. at a rate of 10° C./min under argon (Ar) gas, and the composite precursor was then sintered while maintaining the temperature for 2 hours to prepare porous Si/carbon particles on which a composite coating layer, as a second shell layer having outer strength increased by carbonization, was formed.

As a result, a porous silicon-carbon composite was manufactured in which a total volume of first pores and second pores was about 200 vol % based on a total volume of the active particles of a core, an average particle diameter of the second pores was 200 nm, an average particle diameter (D50) of the core was in a range of 0.5 μm to 50 μm, and an average particle diameter (D50) of the composite was 0.5 μm to 55 μm.

Figure 4:
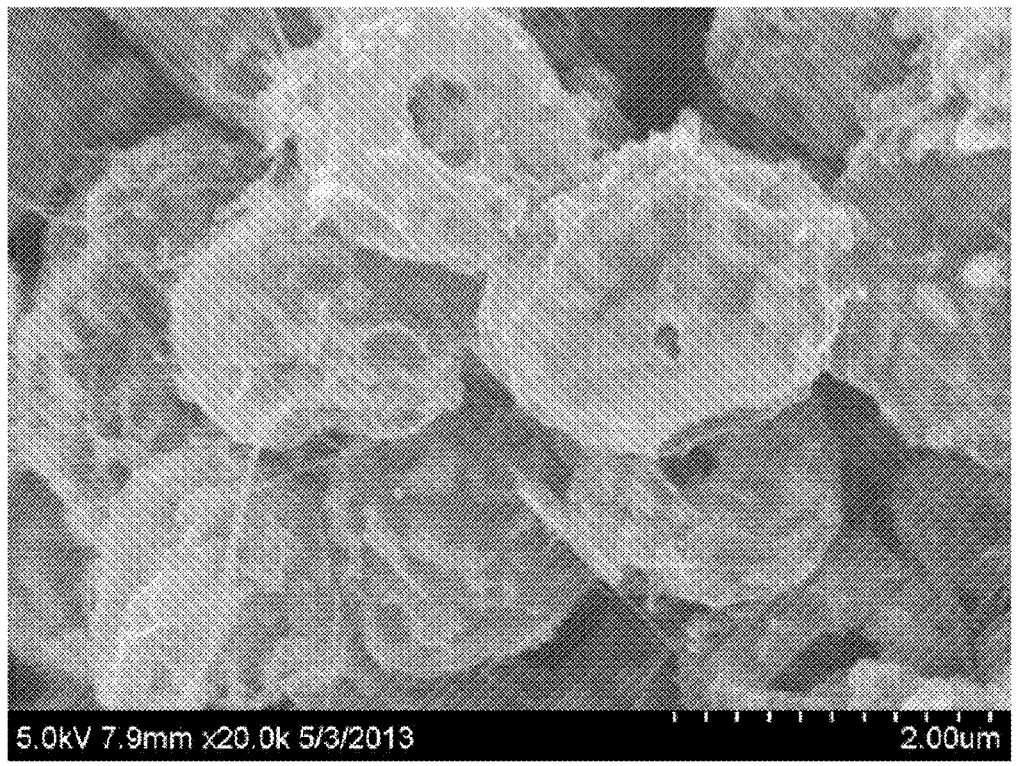
FIG. 4 is an SEM image of a graphene-coated porous silicon-carbon composite manufactured according to Example 4 of the present invention.

An SEM image of the porous Si/C composite manufactured is as illustrated in FIG. 4. Referring to FIG. 4, it may be confirmed that the conductive material was randomly disposed between the silicon particles of the porous composite to form a conductive network and a composite coating layer was formed on the outside of the composite.

Comparative Example 1: Manufacture of Si/CNT/PS Composite (First Shell Layer Including Graphene was not Formed)

0.7 g of lignosulfonate was added to an aqueous dispersion in which 0.7 g of CNT having a diameter of 3 μm was dispersed in 500 g of water and then stirred and mixed for 30 minutes. 7 g of Si powder having a diameter of 200 nm was added to the mixed solution and a solution, in which Si particles were dispersed, was then prepared using a mechanical homogenizer and ultrasonication. 3.5 g of polystyrene beads was added and then mixed using a homogenizer to prepare a dispersion solution for spray drying.

Next, a Si/C composite precursor was prepared by spray drying the dispersion solution using a B-290 mini spray dryer by Büchi Labortechnika AG at an inlet temperature of 180° C. and then transferred to an alumina boat. The alumina boat was disposed in the middle of a tube furnace equipped with a quartz tube having a length of 80 cm and an inner diameter of 4.8 cm, a temperature of the tube furnace was increased to 600° C. at a rate of 10° C./min under argon (Ar) gas, and the Si/C composite precursor was then sintered while maintaining the temperature for 2 hours.

A silicon-carbon composite including a plurality of pores was manufactured according to the above process.

Comparative Example 2: Manufacture of Si/C/CNT/PS Composite (First Shell Layer Including Graphene was not Formed)

2.1 g of polyaromatic oxide was added to an aqueous dispersion in which 0.7 g of CNT having a diameter of 3 μm was dispersed in 700 g of water and then stirred and mixed for 30 minutes. 7 g of Si powder having a diameter of 200 nm was added to the mixed solution and a solution, in which Si particles were dispersed, was then prepared using a mechanical homogenizer and ultrasonication. 7 g of polystyrene beads having an average particle diameter of 200 nm was added and then mixed using a homogenizer to prepare a dispersion solution for spray drying.

Next, a porous Si/C composite precursor having increased mechanical strength was prepared by spray drying the dispersion solution using a B-290 mini spray dryer by Büchi Labortechnika AG at an inlet temperature of 180° C. and then transferred to an alumina boat. The alumina boat was disposed in the middle of a tube furnace equipped with a quartz tube having a length of 80 cm and an inner diameter of 4.8 cm, a temperature of the tube furnace was increased to 600° C. at a rate of 10° C./min under argon (Ar) gas, and the Si/C composite precursor was then sintered while maintaining the temperature for 2 hours to carbonize the composite precursor.

Figure 5:
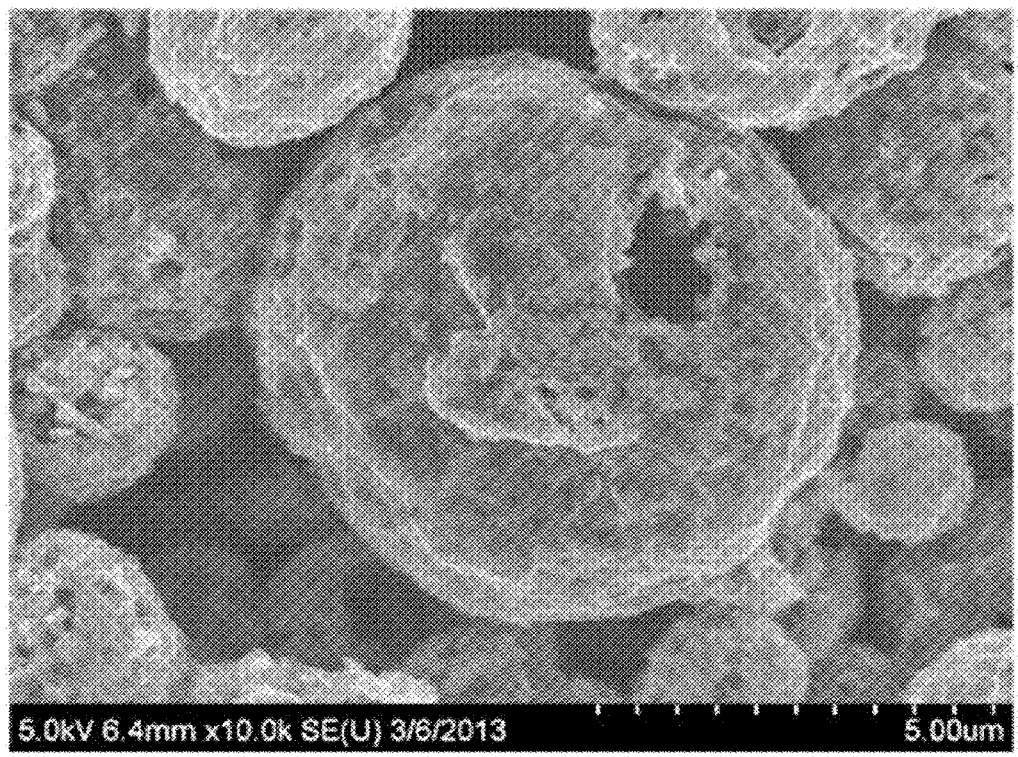
FIG. 5 is an SEM image of a silicon-carbon composite manufactured according to Comparative Example 2 as a related art.

An SEM image of the porous Si/C composite manufactured by the above process is as illustrated in FIG. 5, and, referring to FIG. 5, it may be confirmed that a porous silicon-carbon composite was formed.

Comparative Example 3: Manufacture of Si/C/PS Composite (First Shell Layer Including CNT and Graphene was not Formed)

2.5 g of polyaromatic oxide, as a carbon precursor, was added to a 10 wt % ethanol solution and then stirred at 10,000 rpm for 30 minutes using a mechanical homogenizer. After 5 g of Si powder having a diameter of 200 nm was added to the mixed solution, the solution was stirred at 10,000 rpm for 30 minutes using a mechanical homogenizer and ultrasonication was then performed for 1 hour. 10 g of polystyrene beads having an average particle diameter of 200 nm was added to the dispersed solution and the dispersed solution then again stirred at 10,000 rpm for 30 minutes using a mechanical homogenizer to prepare a dispersion solution for spray drying.

Next, a Si/C composite precursor was prepared by spray drying the dispersion solution using a B-290 mini spray dryer by Büchi Labortechnika AG under conditions including an inlet temperature of 180° C., an aspirator at 95%, and a feeding rate of 12, and then transferred to an alumina boat. The alumina boat was disposed in the middle of a tube furnace equipped with a quartz tube having a length of 80 cm and an inner diameter of 4.8 cm, a temperature of the tube furnace was increased to 600° C. at a rate of 10° C./min under argon (Ar) gas, and the Si/C composite precursor was then sintered while maintaining the temperature for 2 hours to carbonize the composite precursor.

Figure 6:
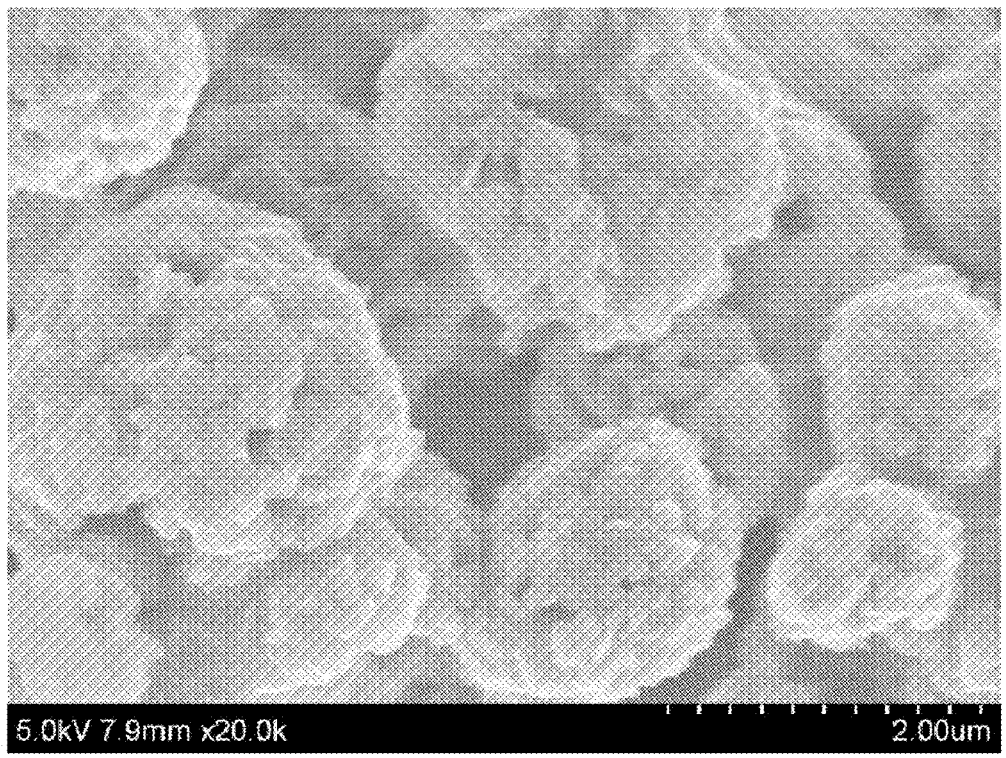
FIG. 6 is an SEM image of a silicon-carbon composite manufactured according to Comparative Example 3 as a related art.

A porous silicon-carbon composite was manufactured according to the above process (see FIG. 6).

Battery Preparation

Example 5

A slurry for electrode coating was prepared by stirring 14.5 g of a polyacrylonitrile-based adhesive solution, 2.0 g of a 5 wt % CNT solution dispersed in NMP, 6.8 g of graphite, and 1.9 g of the graphene-coated Si/C composite manufactured according to Example 1 for 10 minutes using a paste mixer.

After the prepared slurry was coated on a copper foil to have a height of 64 μm using a comma coater, the coated copper foil was dried at 100° C. for 12 hours under vacuum, and an electrode was then prepared by rolling the dried copper foil to have a density of 1.3 g/cc. The electrode was disposed at the center of a bottom plate of a coin-half cell, and a separator and a lithium (Li) foil were sequentially stacked. Thereafter, an electrolyte solution composed of a combination of cyclic carbonate and linear carbonate was added, and a top plate was then stacked and pressed to prepare a coin-half cell.

Example 6

A slurry for electrode coating was prepared in the same manner as in Example 5 except that the graphene-coated Si/C composite of Example 2 was used instead of the graphene-coated Si/C composite of Example 1.

Subsequently, an electrode and a coin-half cell were prepared using the slurry.

Example 7

A slurry for electrode coating was prepared in the same manner as in Example 5 except that the graphene-coated Si/C composite of Example 3 was used instead of the graphene-coated Si/C composite of Example 1.

Example 8

A slurry for electrode coating was prepared in the same manner as in Example 5 except that the graphene-coated Si/C composite of Example 4 was used instead of the graphene-coated Si/C composite of Example 1.

Comparative Example 3

A slurry for electrode coating was prepared in the same manner as in Example 5 except that the Si/C composite of Comparative Example 1 was used instead of the graphene-coated Si/C composite of Example 1.

Comparative Example 4

A slurry for electrode coating was prepared in the same manner as in Example 5 except that the Si/C composite of Comparative Example 2 was used instead of the graphene-coated Si/C composite of Example 1.

Comparative Example 5

A slurry for electrode coating was prepared in the same manner as in Example 5 except that the Si/C composite of Comparative Example 3 was used instead of the graphene-coated Si/C composite of Example 1.

Experimental Examples

Experiment 1

The coin-half cells prepared according to Example 6 and Comparative Example 3 were charged and discharged at 0.1 C for the $1^{st}$ cycle, and a cut-off voltage was 1.5 V. For a $2^{nd}$ cycle, the coin-half cells were charged and discharged at 0.1 C and a cut-off voltage was set to 1.0 V.

The coin-half cells were charged and discharged at 0.5 C for the subsequent cycles, and a cut-off voltage was set to 1.0 V to perform 48 charge and discharge cycles.

$$\text{specific discharge capacity}(mAhg^{-1}) = \frac{\text{Discharge capcity}(mAh)}{\text{Weight of active material coated on surface of negtaive electrode (g)}} \quad \text{(eqn. 1)}$$

For the accurate comparison of discharge capacities of the coin-half cells, capacity retention ratios were obtained by eqn. 1 and eqn. 2 and compared. In this case, since the first and second cycles were formation process, the comparison of these cycles was omitted and the comparison was performed from a third cycle.

$$\text{Capacity retention (\%)} = \frac{\text{Specific discharge capacity for each cycle}}{\text{Specific discharge capacity in the third cycle}} \times 100 \quad \text{(eqn. 2)}$$

Figure 7:
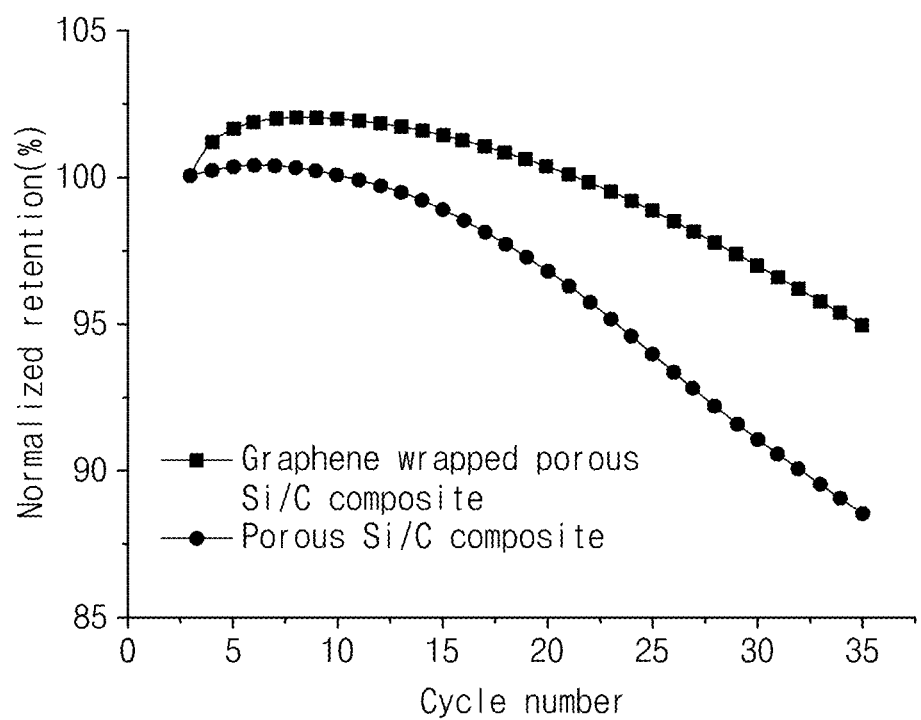
FIG. 7 is a graph illustrating capacity retention versus cycle number of lithium secondary batteries according to Experimental Example 1 of the present invention.

Capacity retention versus cycle number of the lithium secondary batteries measured according to the experiment is illustrated in FIG. 7.

Referring to FIG. 7, it may be confirmed that the lithium secondary battery, which was configured to include the negative electrode including the graphene-coated porous silicon-carbon composite manufactured according to Example 2 of the present invention as a negative electrode active material, exhibited relatively good capacity retention in comparison to the lithium secondary battery prepared according to Comparative Example 2.

Experiment 2

In order to confirm that polystyrene was subjected to a cross-linking reaction with the carbon precursor during the sintering, 10 mg of polystyrene beads (compound A), 10 mg of polyaromatic oxide (compound B) as the carbon precursor, and 10 mg of a mixture (compound C), in which the polystyrene beads and the polyaromatic oxide as the carbon precursor were mixed in a ratio of 95.2%:4.8%, were prepared, respectively.

Figure 8:
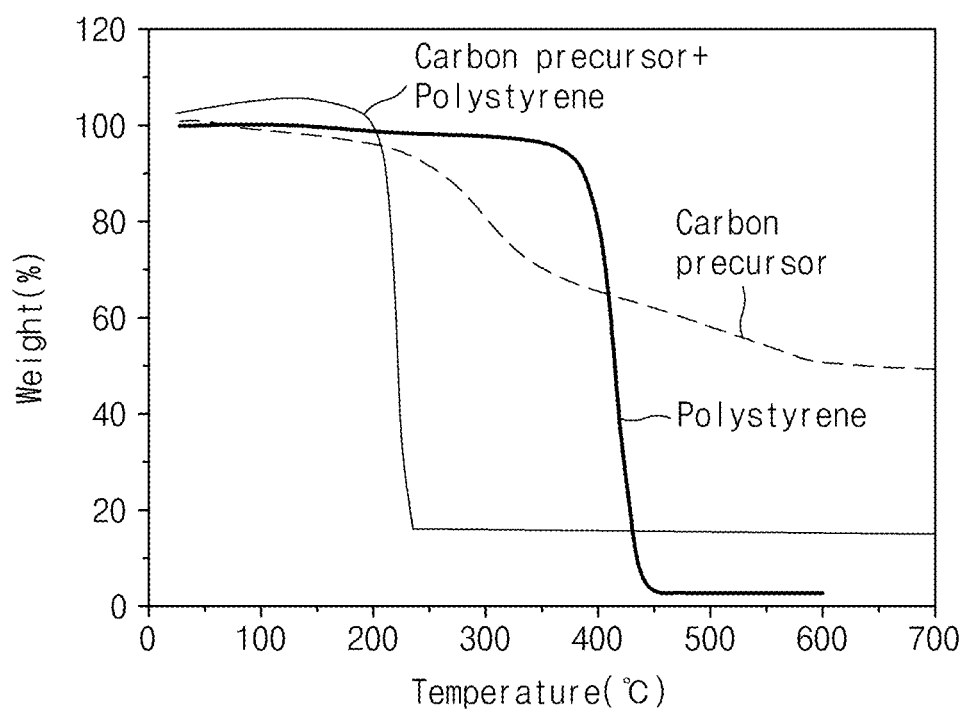
FIG. 8 is a graph in which that a thermal decomposition product of a polymer is cross-linked with a carbon precursor in a porous silicon-carbon composite according to Experimental Example 2 of the present invention may be confirmed.

Compounds A, compound B, and compound C were carbonized by respectively sintering at 600° C. for 2 hours, and were then subjected to thermogravimetric analysis (TGA), and the results thereof are illustrated in FIG. 8.

Referring to the results of FIG. 8, after the sintering, an amount of compound A remained was 50.26% of its initial amount, and an amount of compound B remained was 1.7% of its initial amount. An amount of compound C remained would be 4.03% (=(0.5026×4.8%)+(0.017×95.2%)) if calculated arithmetically, but since the amount of compound C remained in FIG. 8 was about 14.2% of the initial amount, it may be confirmed that the amount of the remained compound C was about 3.5 times the predicted value.

From the above results, since monomers or oligomers, as a thermal decomposition product generated by the thermal decomposition of polystyrene, were subjected to a cross-linking reaction with the carbon precursor and remained, it may be confirmed that the large remaining amount as described above was obtained.

Experiment 3

In the process of preparing the coin-half cells according to Example 7 and Comparative Example 4, it was confirmed whether the porous Si/carbon particles used as the electrode active material were crushed or not when the particles were subjected to the rolling process for the preparation of the electrode. For this purpose, shapes of the electrodes formed by the rolling process were confirmed by SEM images (see FIGS. 9A and 9B).

Figure 9A:
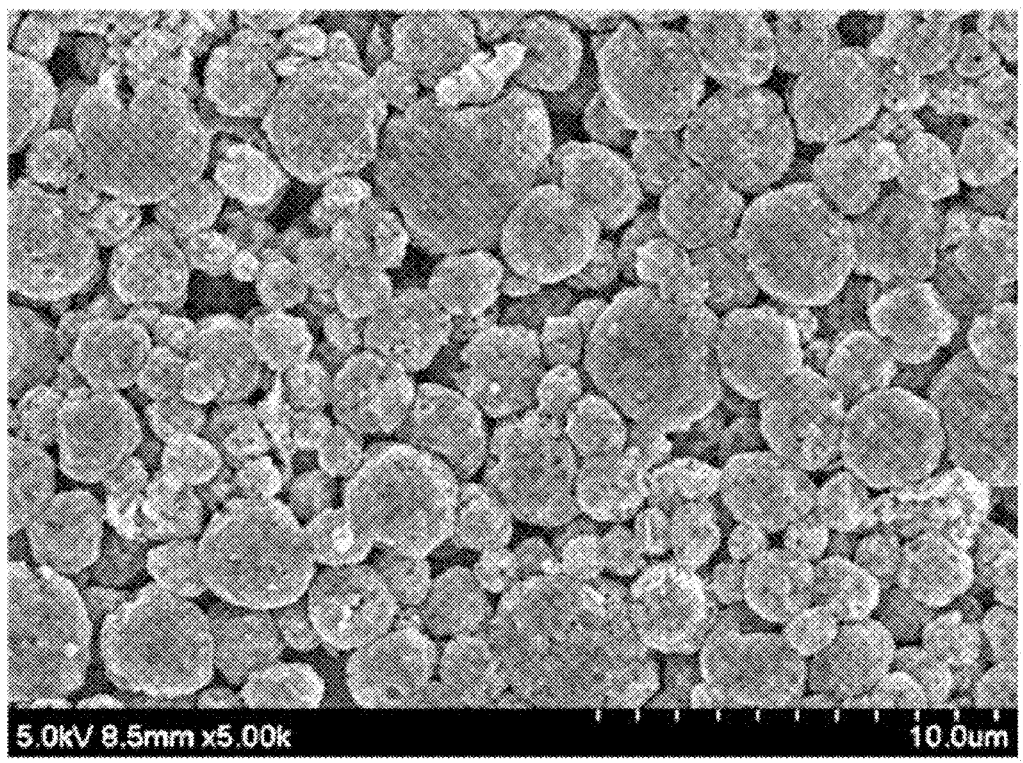
FIGS. 9A to 9B are SEM images of surfaces of electrodes including porous silicon-carbon composites according to Experimental Example 3 of the present invention.

Referring to FIG. 9A according to Example 7, it may be confirmed that the composite particles only had a somewhat depressed shape, but were not crushed even after the porous silicon-carbon particles prepared using the polymer beads as well as the porogen as in the present invention were made into a slurry, coated on the current collector, and then pressed.

Figure 9B:
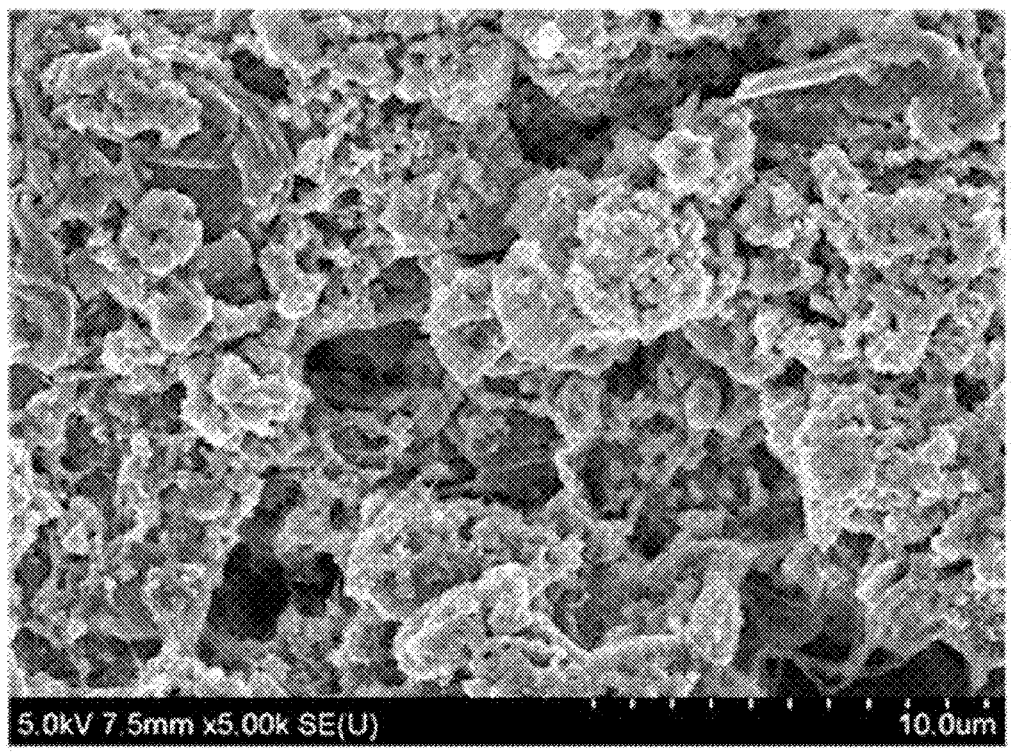

In contrast, referring to FIG. 9B according to Comparative Example 4, it may be confirmed that the composite particles were completely crushed so that their shapes did not remain after the porous silicon-carbon particles were made into a slurry, coated on the current collector, and then pressed.

Thus, in a case in which the composite was manufactured using the polymer beads as well as the porogen as in the present invention, since the mechanical strength was increased, it may be confirmed that the composite particles were not crushed when preparing the slurry by including the composite or during the preparation of the electrode.

Experiment 4

The coin-half cells prepared according to Example 7 and Comparative Example 4 were charged and discharged at 0.1 C for the $1^{st}$ cycle, and a cut-off voltage was 1.5 V. For a $2^{nd}$ cycle, the coin-half cells were charged and discharged at 0.1 C and a cut-off voltage was set to 1.0 V.

The coin-half cells were charged and discharged at 0.5 C for the subsequent cycles, and a cut-off voltage was set to 1.0 V to perform 48 charge and discharge cycles. Battery performance was compared by obtaining specific discharge capacity (eqn. 1) versus cycle number of each coin-half cell.

$$\text{specific discharge capacity}(mAhg^{-1}) = \frac{\text{Discharge capcity}(mAh)}{\text{Weight of active material coated on surface of \textit{negtaive} electrode (g)}} \quad \text{(eqn. 1)}$$

When using the above method, since the discharge capacities of the coin-half cells were not the same, an accurate performance comparison was not possible, and thus, the specific discharge capacity for each cycle was converted into a capacity retention ratio by eqn. 2 to perform a detailed comparison. In this case, since the first and second cycles were formation process, the comparison of these cycles was omitted and the comparison was performed from a third cycle.

$$\text{Capacity retention (\%)} = \frac{\text{Specific discharge capacity for each cycle}}{\text{Specific discharge capacity in the third cycle}} \times 100 \quad \text{(eqn. 2)}$$

Figure 10A:
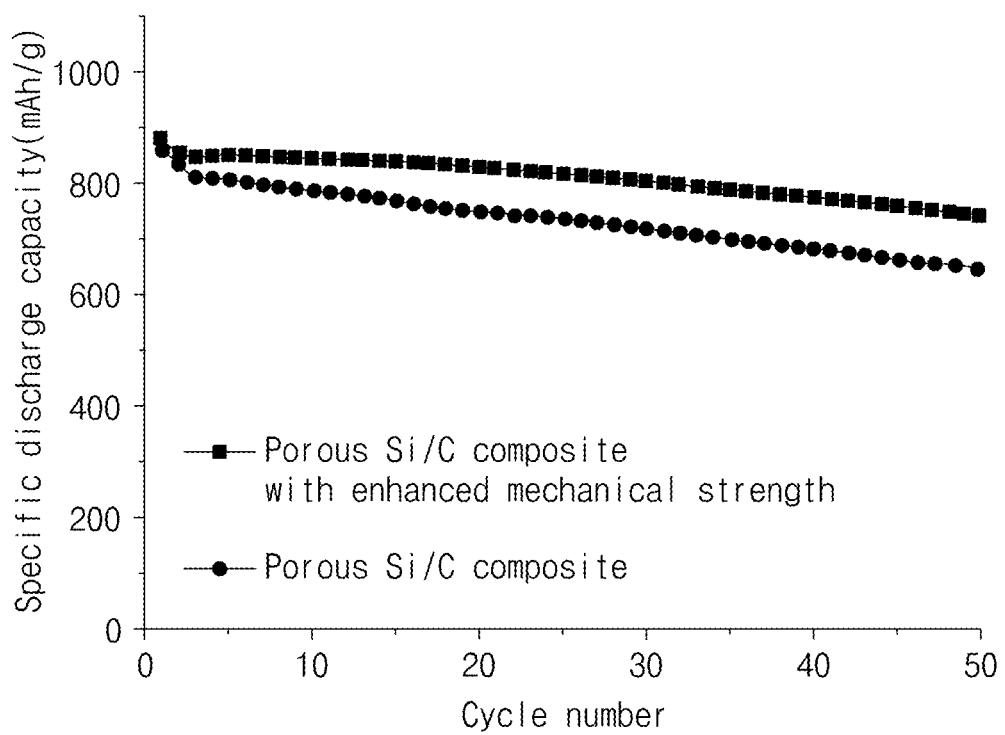
FIGS. 10A and 10B are graphs illustrating discharge capacity and capacity retention versus cycle number of lithium secondary batteries according to Experimental Example 4 of the present invention.
Figure 10B:
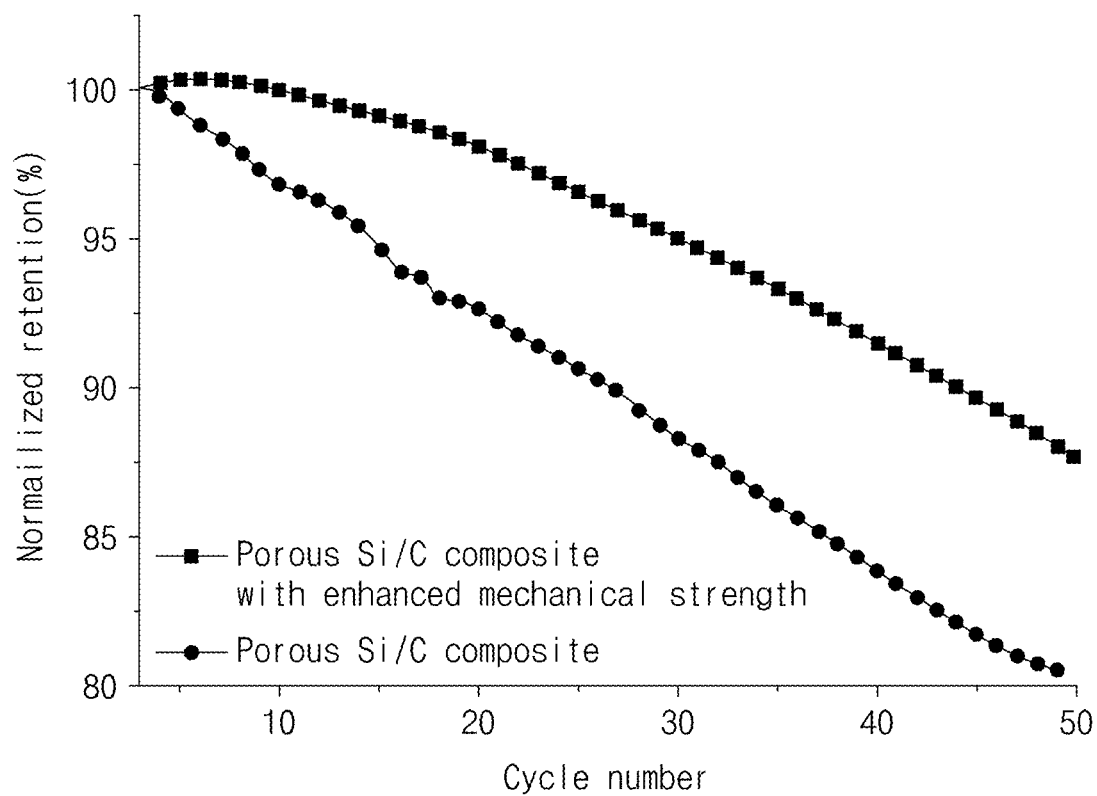

Discharge capacity and capacity retention versus cycle number of the lithium secondary batteries measured according to the experiment are illustrated in FIGS. 10A and 10B, respectively.

Referring to FIGS. 10A and 10B, it may be confirmed that the lithium secondary battery, which was configured to include the negative electrode including the porous silicon-carbon composite manufactured according to Example 2 of the present invention as a negative electrode active material, exhibited relatively high discharge capacity and good capacity retention in comparison to the lithium secondary battery prepared according to Comparative Example 2.

Experiment 5

In the process of preparing the coin-half cells according to Example 8 and Comparative Example 5, it was confirmed whether the porous Si/carbon particles used as the electrode active material were crushed or not after the particles were subjected to the rolling process for the preparation of the electrode. For this purpose, shapes of the electrodes formed by the rolling process were confirmed by SEM images (see FIGS. 11A and 11B).

Figure 11A:
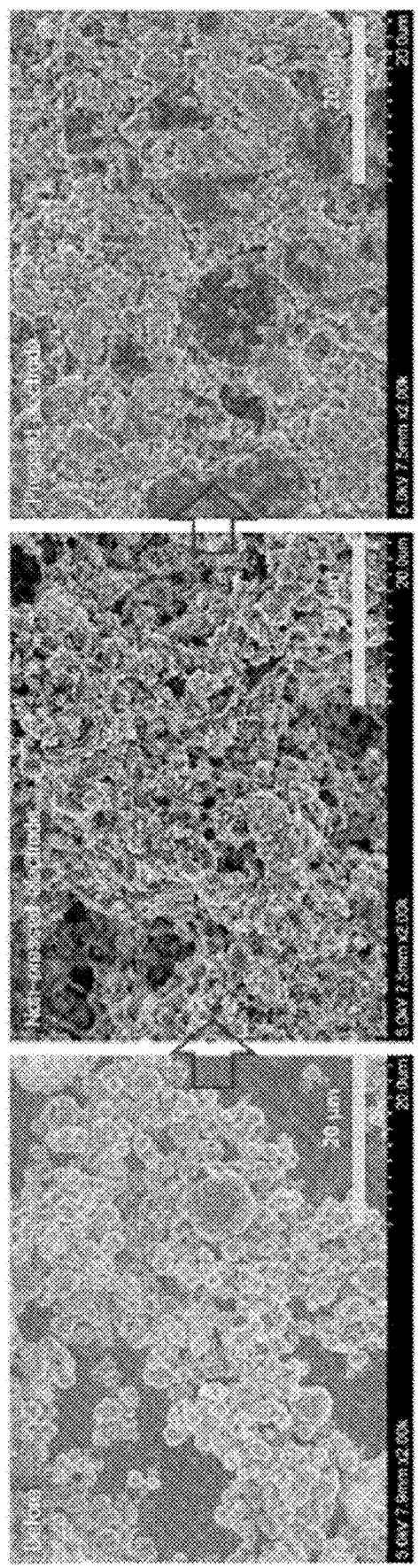
FIGS. 11A to 11B are SEM images of surfaces of electrodes according to Experimental Example 5 of the present invention.

Referring to FIG. 11A according to Example 8, it may be confirmed that the particle shape remained as it was even after the porous silicon-carbon particles having the composite coating layer formed thereon were made into a slurry, and it may be confirmed that the composite particles only had a somewhat depressed shape, but were not crushed even after the porous silicon-carbon particles were coated on the current collector and then pressed.

Figure 11B:
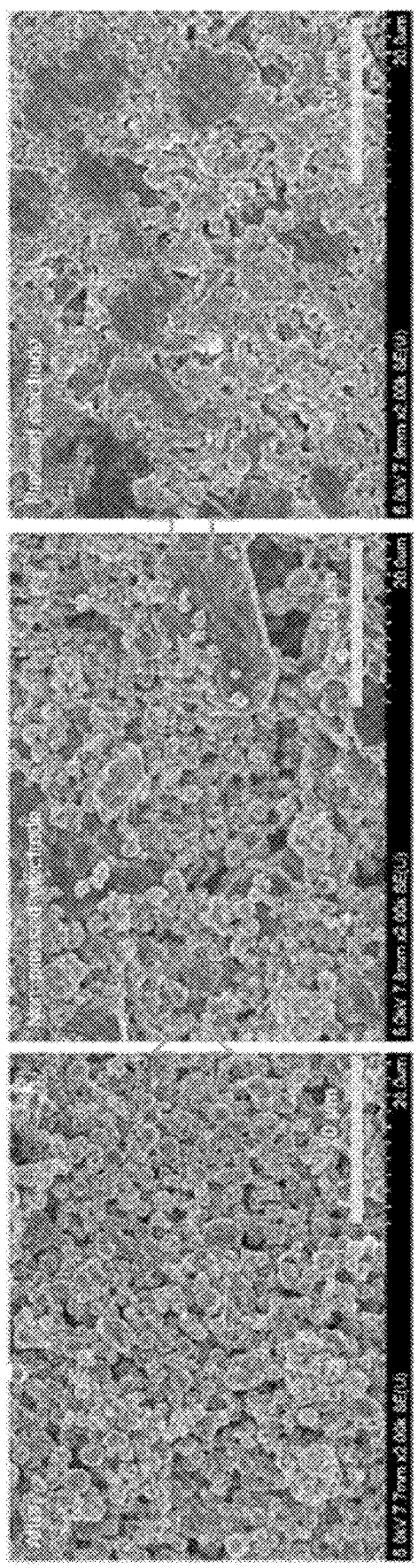

In contrast, referring to FIG. 11B according to Comparative Example 5, crushing of the porous silicon-carbon particles was already in progress during the preparation of the slurry, and it may be confirmed that the composite particles were completely crushed so that their shapes did not remain after the composite particles were coated on the current collector and then pressed.

Thus, in a case in which the composite coating layer was formed on the outside of the composite particles as in the present invention, since the mechanical strength was increased, it may be confirmed that the composite particles were not crushed when preparing the slurry by including the composite or during the preparation of the electrode.

Experiment 6

The coin-half cells prepared according to Example 8 and Comparative Example 5 were charged and discharged at 0.1 C for the $1^{st}$ cycle, and a cut-off voltage was 1.5 V. For a $2^{nd}$ cycle, the coin-half cells were charged and discharged at 0.1 C and a cut-off voltage was set to 1.0 V.

The coin-half cells were charged and discharged at 0.5 C for the subsequent cycles, and a cut-off voltage was set to 1.0 V to perform 48 charge and discharge cycles. Battery performance was compared by obtaining specific discharge capacity (eqn. 1) versus cycle number of each coin-half cell.

$$\text{specific discharge capacity}(mAhg^{-1}) = \frac{\text{Discharge capcity}(mAh)}{\text{Weight of active material coated on surface of \textit{negtaive} electrode (g)}} \quad \text{(eqn. 1)}$$

When using the above method, since the discharge capacities of the coin-half cells were not the same, an accurate performance comparison was not possible, and thus, the specific discharge capacity for each cycle was converted into a capacity retention ratio by eqn. 2 to perform a detailed comparison. In this case, since the first and second cycles were formation process, the comparison of these cycles was omitted and the comparison was performed from a third cycle.

$$\text{Capacity retention (\%)} = \frac{\text{Specific discharge capacity for each cycle}}{\text{Specific discharge capacity in the third cycle}} \times 100 \quad \text{(eqn. 2)}$$

Figure 12A:
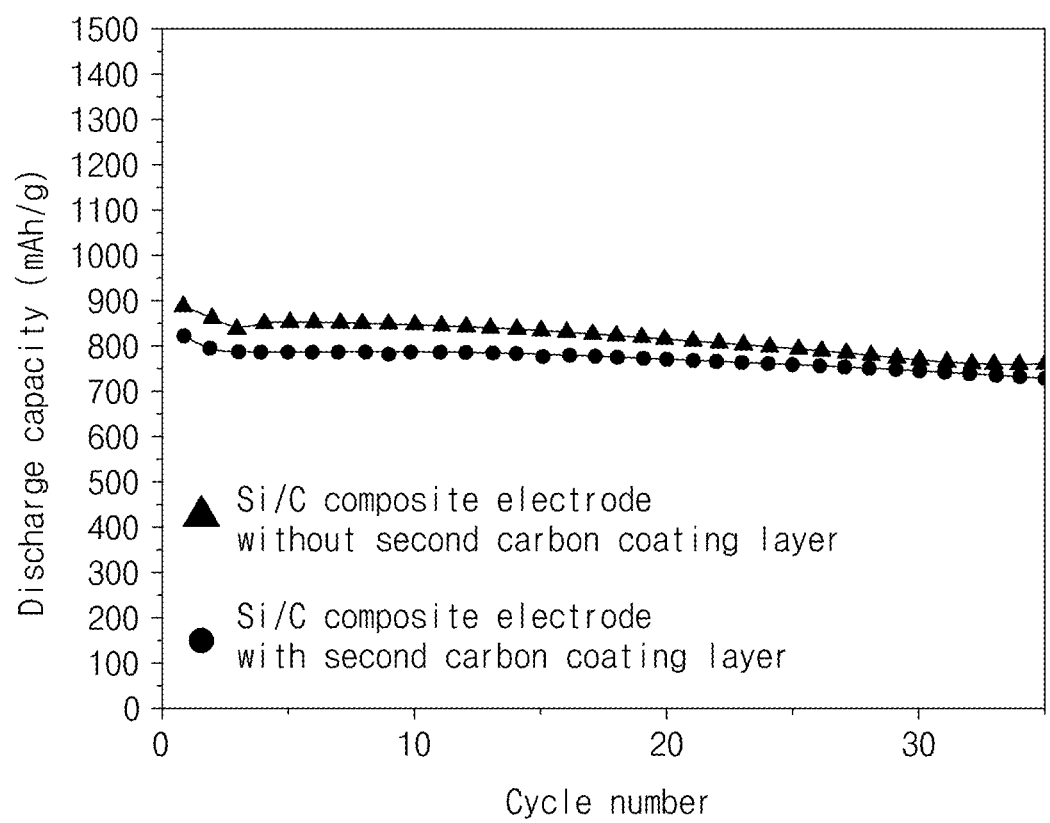
FIGS. 12A and 12B are graphs illustrating discharge capacity and capacity retention versus cycle number of lithium secondary batteries according to Experimental Example 6 of the present invention.
Figure 12B:
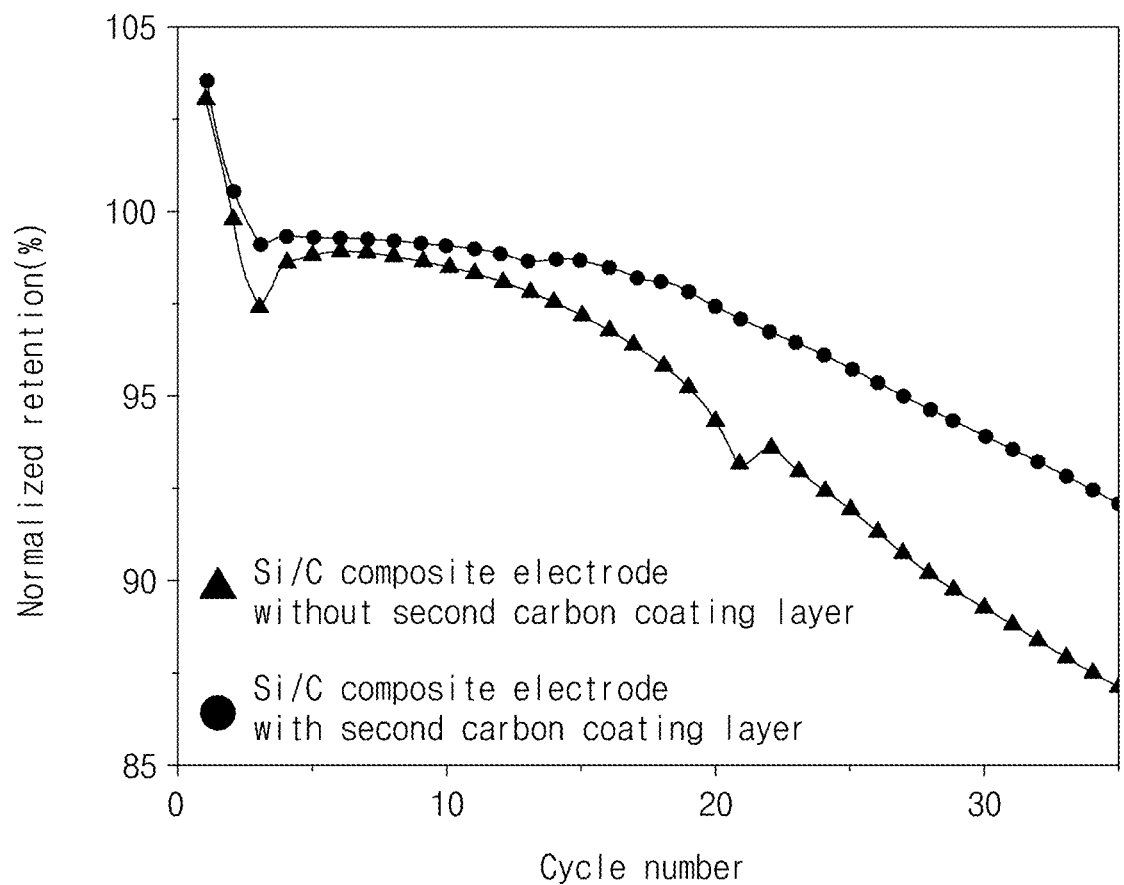

Discharge capacity and capacity retention versus cycle number of the lithium secondary batteries measured according to the experiment are illustrated in FIGS. 12A and 12B, respectively.

Referring to FIGS. 12A and 12B, it may be confirmed that the lithium secondary battery, which was configured to include the negative electrode including the porous silicon-carbon composite manufactured according to Example 2 of the present invention as a negative electrode active material, exhibited relatively good capacity retention in comparison to the lithium secondary battery prepared according to Comparative Example 2.

The invention claimed is:

1. A porous silicon-carbon composite for a negative electrode active material comprising:

a core including a plurality of active particles, a conductive material formed on at least a portion of surfaces of the plurality of active particles, first pores, and second pores; and a first shell layer which is coated on the core and includes graphene, wherein the plurality of active particles comprise a plurality of silicon particles, silicon oxide particles, or a combination thereof, the first pores are present in the core and are formed by being surrounded by the plurality of active particles adjacent to a first pore, and the first pore is a non-linear pore in which an outer surface of the first pore is formed along the surfaces of the plurality of adjacent active particles, and the second pores are irregularly dispersed and present in the core, has an average particle diameter smaller than an average particle diameter of the plurality of active particles, and are spherical, wherein the second pores are formed by dispersing a porogen in a mixture for forming the core, and sintering to form the second pores in positions where the porogen was dispersed;

wherein a total volume of the first pores and the second pores is in a range of 50 vol % to 300 vol % based on a total volume of the plurality of active particles of the core, wherein an average particle diameter D50 of the second pores is in a range of 50 nm to 500 nm, wherein the average particle diameter D50 of the second pores is smaller than an average particle diameter of plurality of the active particles and larger than that of the first pores, and wherein the conductive material comprises carbon nanotubes and is present in a network structure or thread structure in which the carbon nanotubes are bonded and connected to each other, and is present in a form of being combined with the at least a portion of surfaces of the plurality of active particles.

2. The porous silicon-carbon composite of claim 1, wherein the plurality of active particles comprise a silicon-based composite expressed by $SiO_x$ (0<x≤2).

3. The porous silicon-carbon composite of claim 1, wherein the average particle diameter (D50) of the plurality of active particles is in a range of 3 nm to 900 nm.

4. The porous silicon-carbon composite of claim 1, wherein the plurality of active particles are included in an amount of 10 wt % to 95 wt % based on a total weight of the core.

5. The porous silicon-carbon composite of claim 1, wherein an average particle diameter (D50) of the core is in a range of 0.5 μm to 50 μm.

6. The porous silicon-carbon composite of claim 1, wherein the conductive material is at least further comprises graphene, or amorphous carbon.

7. The porous silicon-carbon composite of claim 1, wherein the conductive material is included in an amount of 1 wt % to 30 wt % based on a total weight of the porous silicon-carbon composite.

8. The porous silicon-carbon composite of claim 1, wherein the plurality of active particles further comprise a carbon coating layer.

9. The porous silicon-carbon composite of claim 8, wherein the carbon coating layer is formed by heat-treating a single material selected from the group consisting of glucose, sucrose, gum arabic, tannic acid, lignosulfonate, poly-aromatic oxide, saccharides, and polyphenols, or a mixture of two or more thereof, which is in a state of being combined with the plurality of active particles.

10. The porous silicon-carbon composite of claim 1, wherein the porogen comprises a polymer material.

11. The porous silicon-carbon composite of claim 10, wherein the polymer material comprises a single material selected from the group consisting of a polystyrene, a polystyrene oligomer, polyacrylonitrile, polyvinylidene fluoride, a copolymer of polyvinylidene fluoride and polyhexafluoropyrene, polytetrafluoroethylene, polyhexafluoropropylene, polyethylene oxide, polypropylene oxide, polyphosphazene, polysiloxane, polyvinyl acetate, polyvinyl alcohol, polymethyl methacrylate, polyacrylic acid, polymethacrylic acid, a styrene-butadiene rubber, a nitrile-butadiene rubber, polyethylene, polypropylene, polybutylene, and polycarbonate, or a mixture of two or more thereof.

12. The porous silicon-carbon composite of claim 10, wherein the polymer material is included in an amount of 1 wt % to 30 wt % based on a total weight of the porous silicon-carbon composite.

13. The porous silicon-carbon composite of claim 1, wherein an average particle diameter (D50) of the porous silicon-carbon composite is in a range of 0.5 μm to 55 μm.

14. The porous silicon-carbon composite of claim 1, further comprising a second shell layer coated on the first shell layer.

15. The porous silicon-carbon composite of claim 14, wherein the second shell layer is formed by a combination of two or more materials selected from the group consisting of carbon, rubber, and carbon nanotubes.

16. A method of manufacturing the porous silicon-carbon composite of claim 1, the method comprising:
    preparing a first mixed solution in which the plurality of silicon or silicon oxide particles, the conductive material, and the porogen are dispersed;
    dispersing graphene oxide in the first mixed solution to prepare a second mixed solution;
    spray drying the second mixed solution to prepare a composite including the core and the first shell layer; and
    sintering the composite to manufacture the porous silicon-carbon composite having a portion of a surface or an entire surface thereof coated with graphene.

17. The method of claim 16, wherein the porogen comprises a polymer bead that is partially pyrolyzed at a high temperature.

18. The method of claim 17, wherein the polymer bead comprises a single material selected from the group consisting of a polystyrene, a polystyrene oligomer, polyacrylonitrile, polyvinylidene fluoride, a copolymer of polyvinylidene fluoride and polyhexafluoropyrene, polytetrafluoroethylene, polyhexafluoropropylene, polyethylene oxide, polypropylene oxide, polyphosphazene, polysiloxane, polyvinyl acetate, polyvinyl alcohol, polymethyl methacrylate, polyacrylic acid, polymethacrylic acid, a styrene-butadiene rubber, a nitrile-butadiene rubber, polyethylene, polypropylene, polybutylene, and polycarbonate, or a mixture of two or more thereof.

19. The method of claim 17, wherein an average particle diameter (D50) of the polymer beads is in a range of 50 nm to 500 nm.

20. The method of claim 16, wherein a volume ratio of the plurality of silicon or silicon oxide particles to the porogen is in a range of 1:0.5 to 1:3.

21. The method of claim 16, further comprising adding a first carbon precursor as a binder during the preparation of the first mixed solution.

22. The method of claim 21, wherein the first carbon precursor comprises a single material selected from the group consisting of glucose, sucrose, gum arabic, tannic acid, lignosulfonate, poly-aromatic oxide, saccharides, and polyphenols, or a mixture of two or more thereof.

23. The method of claim 21, wherein a weight ratio of the first carbon precursor: the plurality of silicon or silicon oxide particles is in a range of 50:50 to 5:95.

24. The method of claim 16, further comprising forming a composite coating layer on the surface of the sintered composite, after the sintering of the composite.

25. The method of claim 24, wherein the composite coating layer is formed by one selected from the group consisting of a second carbon precursor, a rubber precursor, and carbon nanotubes, or a combination of two or more materials thereof.

26. The method of claim 25, wherein the second carbon precursor comprises a single material selected from the group consisting of glucose, sucrose, gum arabic, tannic acid, lignosulfonate, poly-aromatic oxide, pitch, saccharides, and polyphenols, or a mixture of two or more thereof.

27. The method of claim 25, wherein the rubber precursor comprises a single material selected from the group consisting of styrene butadiene styrene, a styrene butadiene rubber, an acrylonitrile-butadiene rubber, and polychloroprene, or a mixture of two or more thereof.

28. The method of claim 25, wherein the carbon nanotubes comprise a single material selected from the group consisting of single-walled carbon nanotubes, multi-walled carbon nanotubes, and carbon nanofibers, or a mixture of two or more thereof.

29. A negative electrode active material comprising the porous silicon-carbon composite of claim 1.

30. A negative electrode comprising the negative electrode active material of claim 29, a conductive agent, and a binder.

31. A lithium secondary battery comprising the negative electrode of claim 30.

* * * * *